United States Patent
Rodriguez

(10) Patent No.: US 9,898,793 B2
(45) Date of Patent: Feb. 20, 2018

(54) METHODS AND ARRANGEMENTS INVOLVING SUBSTRATE MARKING

(71) Applicant: Digimarc Corporation, Beaverton, OR (US)

(72) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 757 days.

(21) Appl. No.: 14/446,068

(22) Filed: Jul. 29, 2014

(65) Prior Publication Data

US 2015/0016664 A1    Jan. 15, 2015

Related U.S. Application Data

(63) Continuation of application No. PCT/US2014/037389, filed on May 8, 2014.

(Continued)

(51) Int. Cl.
*G06T 1/00*     (2006.01)
*G06Q 10/08*     (2012.01)

(Continued)

(52) U.S. Cl.
CPC .......... *G06T 1/0071* (2013.01); *G06Q 10/08* (2013.01); *G06T 1/005* (2013.01); *G07D 7/005* (2017.05);

(Continued)

(58) Field of Classification Search
CPC .............. G07D 7/0046; G07D 7/0073; G06T 2201/0051; G06T 1/005; G06T 1/0021
See application file for complete search history.

(56) References Cited

U.S. PATENT DOCUMENTS

| | | |
|---|---|---|
| 3,827,358 A | 8/1974 | Budai |
| 4,030,722 A | 6/1977 | Irvine et al. |

(Continued)

FOREIGN PATENT DOCUMENTS

| | | |
|---|---|---|
| WO | WO2011161661 | 12/2011 |
| WO | WO2014182963 | 11/2014 |

OTHER PUBLICATIONS

PCT International Search Report and Written Opinion of the International Searching Authority, PCT/US2014/037389 (published as WO/2014/182963), dated Dec. 31, 2014.

*Primary Examiner* — Stephen R Koziol
*Assistant Examiner* — Raphael Schwartz
(74) *Attorney, Agent, or Firm* — Digimarc Corporation

(57) ABSTRACT

First and second patterns are formed on a substrate. A spatial offset between the patterns is determined, and stored for later use in authenticating the substrate. (One or both of the patterns may convey steganographic information. One pattern may be printed, while the other may be embossed.) A smartphone can sense these patterns, determine the spatial offset, and check whether the determined offset matches the earlier-stored offset, to judge whether the substrate is authentic. Another arrangement effects serialization of product packaging by use of paired patterns (at least one of which is typically a watermark pattern) applied in a manner causing a spatial offset between the patterns to progressively vary along a length of a printed web. Still other arrangements involve substrates conveying patterns that degrade over time, e.g., indicating freshness or pressurization condition. A great variety of other features and arrangements are also detailed.

18 Claims, 15 Drawing Sheets

WM2 SUPERIMPOSED ON WM1

Related U.S. Application Data

(60) Provisional application No. 61/821,183, filed on May 8, 2013, provisional application No. 61/858,078, filed on Jul. 24, 2013, provisional application No. 61/907,654, filed on Nov. 22, 2013, provisional application No. 61/909,989, filed on Nov. 27, 2013.

(51) Int. Cl.
   *G07D 7/2033* (2016.01)
   *G07D 7/005* (2016.01)

(52) U.S. Cl.
   CPC .... *G07D 7/2033* (2013.01); *G06T 2201/0063* (2013.01)

(56) References Cited

U.S. PATENT DOCUMENTS

| | | |
|---|---|---|
| 4,173,314 A | 11/1979 | Curran et al. |
| 4,359,178 A | 11/1982 | Hayashi et al. |
| 4,543,152 A | 9/1985 | Nozaka |
| 5,183,251 A | 2/1993 | Sardella |
| 5,645,274 A | 7/1997 | Ubayashi et al. |
| 6,122,403 A | 9/2000 | Rhoads |
| 6,307,949 B1 | 10/2001 | Rhoads |
| 6,321,648 B1 | 11/2001 | Berson |
| 6,332,031 B1 | 12/2001 | Rhoads et al. |
| 6,345,104 B1 | 2/2002 | Rhoads |
| 6,505,223 B1 | 1/2003 | Haitsma et al. |
| 6,590,996 B1 | 7/2003 | Reed et al. |
| 6,608,919 B1 | 8/2003 | Alattar |
| 6,614,914 B1 | 9/2003 | Rhoads et al. |
| 6,636,615 B1 | 10/2003 | Rhoads et al. |
| 6,801,723 B2 | 10/2004 | Herrmann |
| 6,912,295 B2 | 6/2005 | Reed et al. |
| 6,973,197 B2 | 12/2005 | Miller |
| 6,975,744 B2 | 12/2005 | Sharma et al. |
| 7,127,065 B1 | 10/2006 | Depovere et al. |
| 7,188,774 B2 | 3/2007 | Pinchen |
| 7,399,513 B2 | 7/2008 | Pearson et al. |
| 7,537,170 B2 | 5/2009 | Reed et al. |
| 7,540,421 B2 | 6/2009 | Pinchen |
| 7,891,565 B2 | 2/2011 | Pinchen |
| 8,181,884 B2 | 5/2012 | Rodriguez |
| 8,401,224 B2 | 3/2013 | Rhoads |
| 2003/0032033 A1 | 2/2003 | Anglin et al. |
| 2004/0207892 A1* | 10/2004 | Menz ........................ G03H 1/02 359/2 |
| 2005/0078851 A1* | 4/2005 | Jones ........................ G06K 7/12 382/100 |
| 2006/0133647 A1 | 6/2006 | Werner et al. |
| 2007/0165851 A1* | 7/2007 | Roberts ................... G06T 1/005 380/201 |
| 2010/0150434 A1 | 6/2010 | Reed |
| 2010/0310118 A1 | 12/2010 | Rhoads et al. |
| 2011/0161076 A1 | 6/2011 | Davis et al. |
| 2011/0187501 A1 | 8/2011 | Bhattacharjee et al. |
| 2011/0212717 A1 | 9/2011 | Rhoads et al. |
| 2011/0274310 A1 | 11/2011 | Rhoads |
| 2012/0046071 A1 | 2/2012 | Brandis et al. |
| 2012/0078989 A1 | 3/2012 | Sharma |
| 2012/0214515 A1 | 8/2012 | Davis et al. |
| 2012/0284012 A1 | 11/2012 | Rodriguez et al. |
| 2013/0223673 A1 | 8/2013 | Davis et al. |
| 2013/0260727 A1 | 10/2013 | Knudson et al. |
| 2013/0270810 A1 | 10/2013 | Ross |
| 2014/0029809 A1 | 1/2014 | Rhoads |
| 2014/0052555 A1 | 2/2014 | MacIntosh |

\* cited by examiner

| WATERMARK PAYLOAD | METADATA | OFFSET A | OFFSET B |
|---|---|---|---|
| 6FA243 | Yoplait Blueberry Hayworth, CA Lot 20130508G | 1.4 waxels | 31.7 waxels |
| 6FA244 | Yoplait Banana Hayworth, CA Lot 20130509A | -0.8 waxels | 79.1 waxels |
| 6FA245 | Yoplait Peach Hayworth, CA Lot 20130509C | 2.1 waxels | 17.2 waxels |
| 6FA246 | Yoplait Peach Hayworth, CA Lot 20130510A | 0.6 waxels | 106.8 waxels |

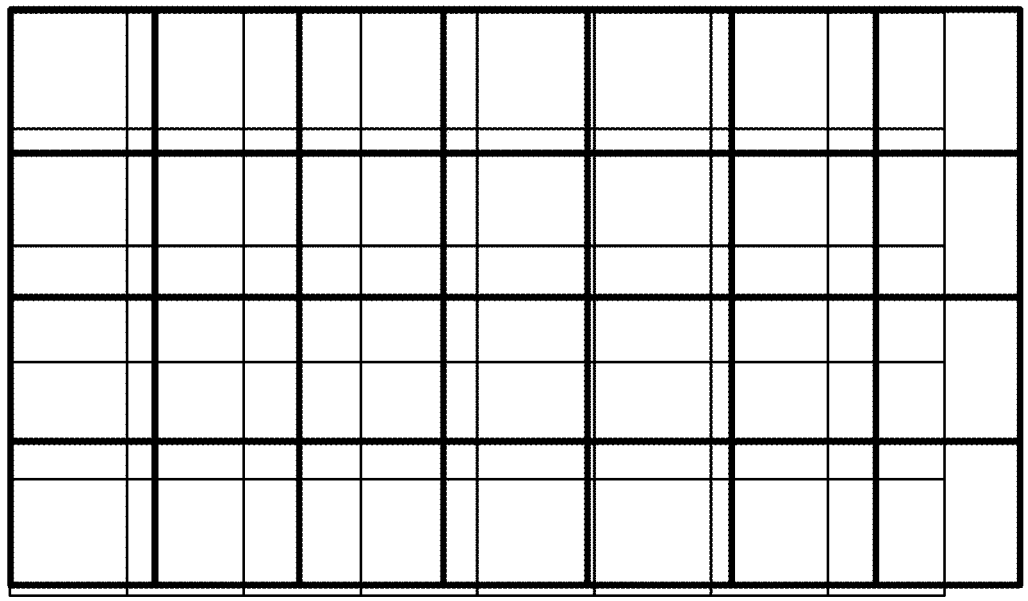
WM2 SUPERIMPOSED ON WM1
FIG. 10
FIG. 11
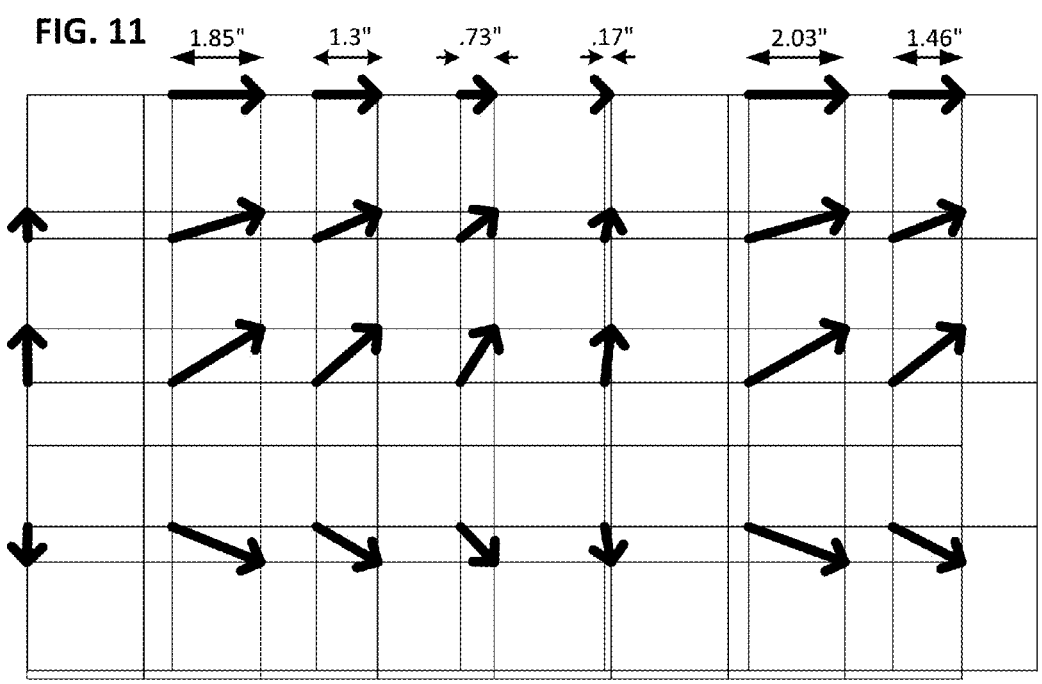
VECTORS FROM UPPER LEFT ORIGIN OF EACH WM1, TO NEAREST WM2 ORIGIN (to the right)

| WM1 EDGE | WM2 EDGE |
|---|---|
| 0 | 0 |
| 2.98 | 2.42 |
| 5.95 | 4.83 |
| 8.93 | 7.25 |
| 11.91 | 9.66 |
| 14.88 | 12.08 |
| 17.86 | 14.49 |
| 20.84 | 16.91 |
| 23.81 | 19.32 |
| 26.79 | 21.74 |
| 29.77 | 24.15 |
| 32.74 | 26.57 |
| 35.72 | 28.98 |
| 38.70 | 31.40 |
| 41.67 | 33.81 |
| 44.65 | 36.23 |
| 47.63 | 38.64 |
| 50.60 | 41.06 |
| 53.58 | 43.47 |
| 56.56 | 45.89 |
| 59.53 | 48.30 |
| 62.51 | 50.72 |
| 65.49 | 53.13 |
| 68.47 | 55.55 |
| 71.44 | 57.96 |
| 74.42 | 60.38 |
| 77.40 | 62.79 |
| 80.37 | 65.21 |
| 83.35 | 67.62 |
| 86.33 | 70.04 |
| 89.30 | 72.45 |
| 92.28 | 74.87 |
| 95.26 | 77.28 |
| 98.23 | 79.70 |
| 101.21 | 82.11 |
| 104.19 | 84.53 |
| 107.16 | 86.94 |
| 110.14 | 89.36 |
| 113.12 | 91.77 |
| 116.09 | 94.19 |
| 119.07 | 96.60 |
| 122.05 | 99.02 |
| 125.02 | 101.43 |
| 128.00 | 103.85 |
|  | 106.26 |
|  | 108.68 |
|  | 111.09 |
|  | 113.51 |
|  | 115.92 |
|  | 118.34 |
|  | 120.75 |
|  | 123.17 |
|  | 125.58 |
|  | 128.00 |

FIG. 12A

| WM1 EDGE | DIFFERENCE |
|---|---|
| 0 | 0 |
| 2.98 | 1.85 |
| 5.95 | 1.30 |
| 8.93 | 0.73 |
| 11.91 | 0.17 |
| 14.88 | 2.03 |
| 17.86 | 1.46 |
| 20.84 | 0.90 |
| 23.81 | 0.34 |
| 26.79 | 2.19 |
| 29.77 | 1.63 |
| 32.74 | 1.07 |
| 35.72 | 0.51 |
| 38.70 | 2.36 |
| 41.67 | 1.80 |
| 44.65 | 1.24 |
| 47.63 | 0.67 |
| 50.60 | 0.12 |
| 53.58 | 1.97 |
| 56.56 | 1.40 |
| 59.53 | 0.85 |
| 62.51 | 0.28 |
| 65.49 | 2.13 |
| 68.47 | 1.57 |
| 71.44 | 1.01 |
| 74.42 | 0.45 |
| 77.40 | 2.30 |
| 80.37 | 1.74 |
| 83.35 | 1.18 |
| 86.33 | 0.61 |
| 89.30 | 0.06 |
| 92.28 | 1.91 |
| 95.26 | 1.34 |
| 98.23 | 0.79 |
| 101.21 | 0.22 |
| 104.19 | 2.07 |
| 107.16 | 1.52 |
| 110.14 | 0.95 |
| 113.12 | 0.39 |
| 116.09 | 2.25 |
| 119.07 | 1.68 |
| 122.05 | 1.12 |
| 125.02 | 0.56 |
| 128.00 | 0 |

FIG. 12B

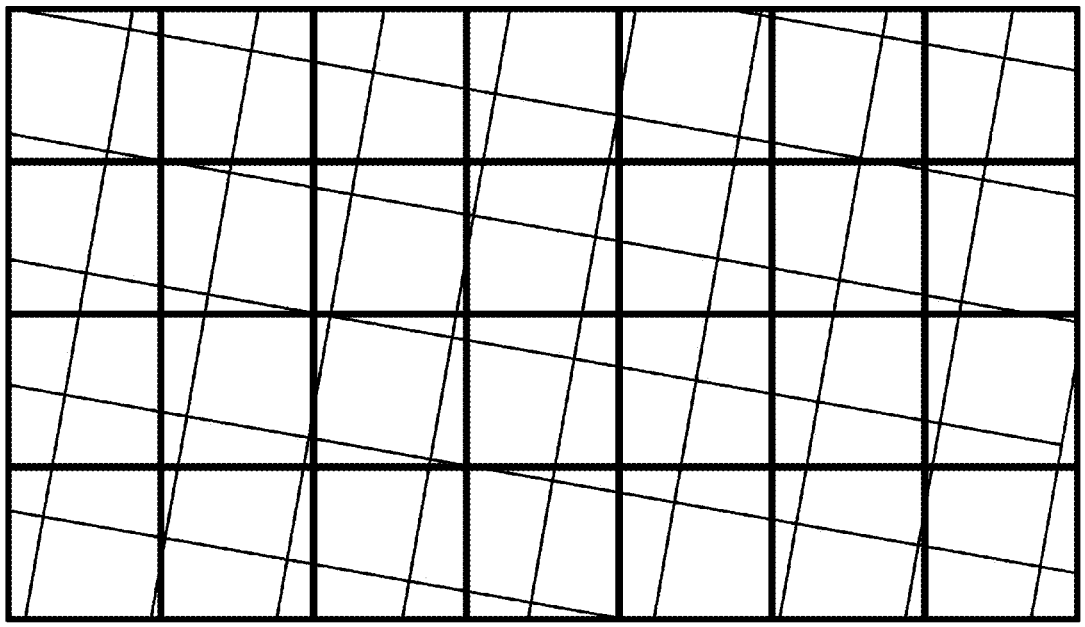
FIG. 13
FIG. 14
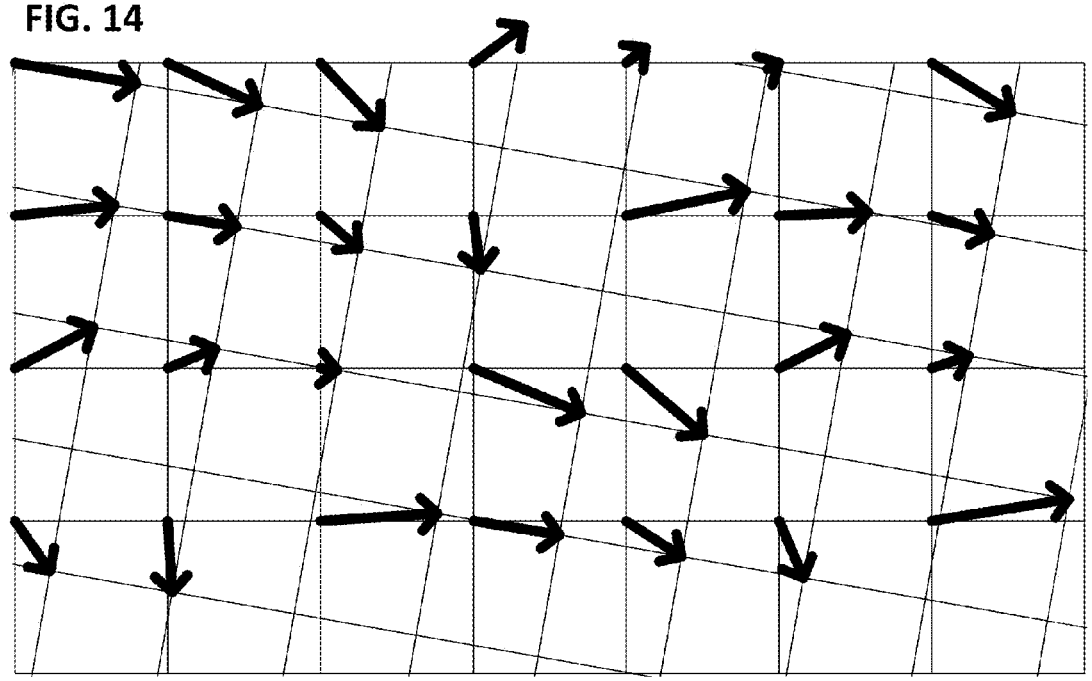

FIRST STAGE OF OPERATION

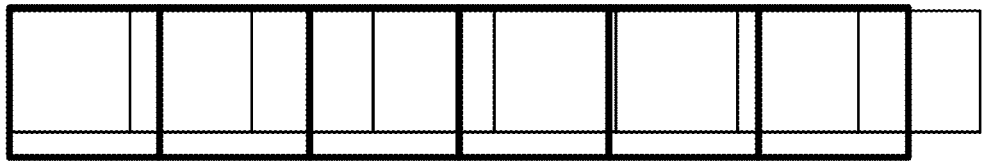

LEFT EDGE OF FIRST FULL WM2 TILE COINCIDES WITH LEFT EDGE OF FIRST
FULL WM1 TILE, FOR PHASE OFFSET OF 0 DEGREES

PRINT MULTIPLE TILES OF WM1, WM2 ON WEB SUBSTRATE IN FIRST STAGE OF OPERATION...

CHANGE (E.G., RANDOMIZE) PHASE RELATIONSHIP BETWEEN ROLLER MECHANISMS,
E.G:

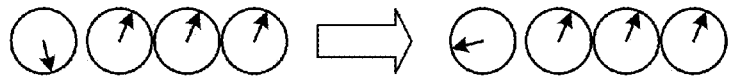

SECOND STAGE OF OPERATION

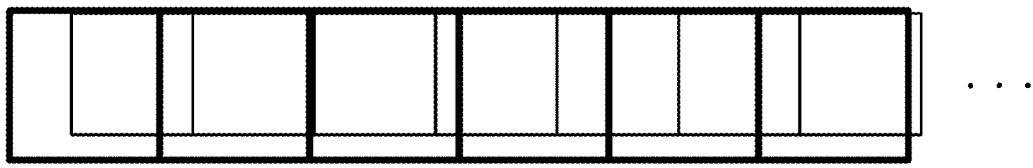

LEFT EDGE OF FIRST FULL WM2 TILE IS AT PHASE OFFSET OF 147 DEGREES
RELATIVE TO LEFT EDGE OF FIRST FULL WM2 TILE

PRINT MULTIPLE TILES OF WM1, WM2 ON WEB SUBSTRATE IN SECOND STAGE OF OPERATION

FIG. 19

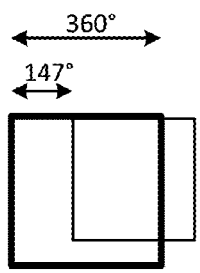

FIG. 19A

METHODS AND ARRANGEMENTS INVOLVING SUBSTRATE MARKING

RELATED APPLICATION DATA

This application is a continuation of PCT application PCT/US14/37389, filed May 8, 2014, which claims priority to applications 61/821,183, filed May 8, 2013; 61/858,078, filed Jul. 24, 2013; 61/907,654, filed Nov. 22, 2013; and 61/909,989, filed Nov. 27, 2013. These applications are incorporated herein by reference.

BACKGROUND AND INTRODUCTION OF TECHNOLOGY

High value items, such as wristwatches and value documents, have always been at risk of counterfeiting. A variety of technologies, sometimes exotic, and expensive, have been developed to combat such crimes.

Counterfeiting has more recently extended into more mundane items. Items that are now widely counterfeited include a variety of foodstuffs and pharmaceuticals. The economics of anti-counterfeiting technologies developed for high value items sometime preclude their use with inexpensive items.

Digital watermarking is used in certain embodiments of the present technology. As is familiar, digital watermarking is used to steganographically mark objects with information (commonly a plural-bit payload) in a manner that permits computer recovery of the information, yet escapes human attention.

In accordance with one aspect of the presently-described technology, material processing that is conventionally employed in manufacturing packaging for pharmaceuticals and foodstuffs, is adapted to provide an inexpensive anti-counterfeiting technology. While inexpensive, the present technology can also serve as a further layer of security for use with high value items.

In one particular embodiment, a substrate (e.g., foil) is ink-printed (or otherwise-printed) with product markings in a conventional manner. The printing (e.g., artwork) is encoded to convey a steganographic digital watermark. This watermark conveys a plural-bit payload, but lacks a spatial calibration signal that is normally included.

The missing spatial calibration signal is provided by an embossing operation, e.g., using a pressure roller. (Foil packaging is often embossed with a fine pattern to improve its aesthetics, and to aid in its machine- and human-handling.)

Since the payload and calibration signal components are applied in different operations, there is typically an unknown spatial offset between their placements on the substrate. That is, they are not perfectly aligned. This offset is sensed following production of the substrate, and corresponding information is stored in a reference database—commonly in association with the watermark payload.

When a suspect product is later found in a retail setting, it can be checked to determine whether the payload and calibration signals are spatially offset in the manner expected (and indicated in the reference database). If not, the product is flagged as counterfeit.

One particular example of such technology is in producing foil or plastic lids for retail yogurt cups. A multitude of yogurt lids are cut from a single roll of such processed substrate. Each lid in the production run is characterized by the same offset between watermarks.

In accordance with a second aspect of the presently-described technology, a substrate is again processed to form plural patterns that are spatially-offset. In this second aspect, however, an offset between two of the patterns is made to vary over the length of the substrate. This variation effects serialization of different portions of the substrate (e.g., serialization between lids, in the just-mentioned yogurt example). Such serialization can serve a variety of advantageous purposes.

A bit of further background: Years ago, it was commonplace for cereal companies to offer prizes for consumers who mailed in five or ten cereal box-tops. (Today there are still fundraisers that involve consumers collecting boxtops, and mailing them in (e.g., to Box Tops for Education) to earn a dime contribution to a designated school or charity.)

Similarly, there have been retail promotions in which the consumer's purchase of a specially-marked product wins the consumer a prize. (Pepsi famously offered a million dollars to the consumer who found a prize-entitling bottle cap. The plot of the Willy Wonka book/movie revolves around such a promotion, which entitled five winners to a lifetime supply of chocolate.) Related are arrangements in which a consumer scratches-off an obscuring coating from a product or card, to reveal a prize, or to reveal an indicia that can be collected with other such indicia to win a prize.

There are now updated counterparts to these promotions—many employing smartphones to enter codes found on or in packages. Starbucks, for example, offers a $10 gift card to consumers who purchase 4 specially-marked bags of coffee, and enter the "star codes" from the packages on a prize redemption web page. (The codes are revealed when an adhesive sticker is pulled from the package.) Other promotions involve use of a smartphone to scan barcodes/QR codes (or other markings) from eligible products, and receive a reward in return.

To prevent a consumer from earning a reward simply by scanning a single product repeatedly (or entering a single product code repeatedly), different instances of the same product should be differently-marked. Starbucks, for example, prints a different star code on the back of each of the peel-off labels.

Such different marking of different instances of product may be regarded as a form of product serialization. In the past, this has involved considerable effort (as illustrated by the separately printed and applied Starbucks stickers).

Serialization is useful for other purposes as well, including tracking particular instances of product through a supply chain, establishing chain of custody, etc.

In accordance with this second aspect of the presently-described technology, methods and arrangements are detailed to serialize large lots of product at minimal (or no) cost.

As is familiar, digital watermarking can be employed to mark objects with two or more watermarks.

Exemplary is an arrangement shown in applicant's U.S. Pat. No. 6,636,615, in which an object is marked with both a frail and a robust watermark. The former degrades when the object is copied—permitting copies to be distinguished from the original object. The robust watermark persists despite copying.

Philips' U.S. Pat. Nos. 6,505,223, 7,127,065 and 20070165851 teach methods for marking video and other media content, employing two or more watermarks that are spatially offset from one another. The offsets are prescribed by a computer system (or a human operator), and serve to communicate desired payload information. BBC's patent document 2006133647 teaches another arrangement in which watermark patterns are shifted in a controlled manner to convey intended information.

Applicant's patent publication 20130223673 discusses how digitally watermarked packaging of grocery items can be used in games and other promotions, and how the hidden nature of the marking helps defeat shopper gaming of such systems.

One exemplary embodiment of this aspect of the present technology employs a web offset printing press, with plural cylinder-based print mechanisms. These cylinders bear printing plates that apply successive layers of ink, in desired patterns, to a roll of paper or other substrate. A printed web of substrate results, and is thereafter cut into items of product packaging (e.g., yogurt lids, labels, etc.).

A printing plate on one of the cylinders is shaped to apply a first repetitively-tiled watermark, and a printing plate on another cylinder is shaped to apply a second repetitively-tiled watermark. The two watermarks are characterized by different measurements, e.g., tile (block) widths. This causes the spatial offset relationship between the two watermarks to vary at different points along the printed substrate—as the printed watermark blocks overlap in progressively changing manners. This variation yields hundreds or thousands of different watermark spatial offsets, which serve as a form of serialization by which different instances of the same product package can be distinguished.

The number of differently-distinguishable packages formed from such a printed web can be exponentially increased, into the tens- or hundreds-of-thousands, or millions, by encoding different information into each of the watermark blocks formed on the printing plates.

Such a production arrangement employs conventional printing apparatus, and adds no cost to the consumables. Yet it yields vast numbers of separately-distinguishable, but seemingly identical (to humans) items. If a consumer captures three cereal box images (e.g., using a smartphone), the images can be examined to determine the spatial offset (and optionally the payload information) that characterizes the watermark marking of each. This discerned information indicates whether the images depict three different boxes, or a single box that has been photographed three times.

In accordance with yet another aspect of the presently-described technology, the degradation of a marking on an item substrate is used to infer information about the item.

More background: Applicant's publication 20040258274 teaches that laminate constructions, e.g., including epoxy, aluminum, mylar, polycarbonate, polyurethane, Teslin (a synthetic film), and vinyl, can convey digital watermark information. Similarly, publication 20050003297 teaches arrangements for forming digitally-watermarked driver's licenses by marking thermoplastics (such as polyvinylchloride (PVC), acrylonitrile butadiene styrene (ABS), polyethylene terephthalate (PET)), and other materials Various of applicant's prior publications teach that watermarks can change over time. For example, U.S. Pat. No. 6,332,031 teaches that the energy level of a watermark signal in a banknote diminishes as the banknote becomes worn. Applicant's U.S. Pat. No. 8,181,884 teaches watermarks whose readability change as a function of time, e.g., based on fluorescence or decaying ink. The patent also teaches watermarks that appear or disappear with changes in temperature, e.g., using thermochromatic inks.

Applicant's U.S. Pat. No. 7,537,170 teaches that a printed digital watermark can be covered with a light-sensitive material that gradually becomes darker, with continued exposure to light (e.g., UV or IR). The watermark thus becomes progressively more difficult to read with repeated exposure to light.

Publication 20130088555 notes that security markings can be formed using inks that fade over time—making them suited for perishables or medications that go out of date.

Publication 20120188319 to Xerox details how a photosensitive shape-memory polymer can be shaped in a desired pattern by turning the polymer glassy using a first wavelength of light. The process can later be reversed by returning the material to its rubbery state using a second wavelength of light.

Similarly, shape memory polymers can be produced as films, and embossed with covert and overt 3D patterns. The pattern is retained in a fixed state at cooler temperatures, but relaxes back to its unpatterned state over time at higher temperatures. Wikipedia notes that such shape memory films can be used as label substrates or face stock for anti-counterfeiting, brand protection, tamper-evident seals, anti-pilferage seals, etc. Xerox's publication 20120279101 details a variety of shape-memory polymers, and their use as product security labeling.

Guangzhou Manborui Material Technology Co., Ltd, offers security labels for wine and other products employing such memory films. In addition to temperature, transition between patterned shapes can be triggered by electric or magnetic fields, light, or solution. (Guangzhou Manborui's technology is detailed in published PCT patent application WO12040985. Particular application of such technology to an anti-counterfeiting wine bottle cap is shown in published Chinese patent application CN201745882.)

Relatedly, artisans in polymer extrusion are familiar with the phenomenon that if a shaped thermoplastic polymer is cooled before the polymer chains can fully relax, stress can be frozen into the patterned shape. This stress relaxes over time—causing degradation of the shaping.

In one particular embodiment of this further aspect of the technology, a substrate (e.g., a foil or plastic film used in product packaging) is processed to convey both a human-visible structure (e.g., printed artwork), and a steganographically-encoded plural bit watermark payload (e.g., an embossed texture pattern). With the passage of time, the latter pattern degrades (e.g., due to the medium's tendency to return to its original, flat, shape). This degradation leads to raw bit errors when the steganographically-encoded payload is detected and decoded (e.g., by a smartphone). Software in the detection system can use a count of these raw bit errors as an indication of the time that has elapsed since the medium was first embossed. Such technology is useful, e.g., to ensure that foodstuffs and medications are fresh.

In another arrangement, such a film serves as a seal for a container having evacuated or pressurized contents. Under such forces, the substrate is stretched, again leading to distortion of the steganographic pattern, and degradation of the encoded raw bits. Software in the detection system can use a count of resulting raw bit errors to indicate whether the desired pressurization/evacuation has been maintained, or whether the container has reverted to atmospheric pressure.

The foregoing and other features and advantages of the present technology will be more readily apparent from the following detailed description, which proceeds with reference to the accompanying drawings.

BRIEF DESCRIPTION OF THE DRAWINGS

FIG. 10 shows the first and second watermark block patterns of FIGS. 8 and 9 superimposed, e.g., on a printed substrate.

FIG. 11 shows vector arrows indicating the spatial offset (distance and angle) between the origin of each first watermark block pattern, and the origin of the nearest (to the right) second watermark block pattern. (No vector is shown in the upper left corner, because the two pattern origins are coincident.)

FIG. 12A shows the spatial position, in inches, of the left edge of successive first watermark blocks (first column) and second watermark blocks (second column)—illustrating how the spatial relationship between the differently-sized blocks progressively changes as more substrate is printed. The arrows associate each first watermark block edge to a nearest (to the right) second watermark block edge.

FIG. 12B repeats the same first column as FIG. 12A, and additionally shows the spatial offset difference (in inches) between the two watermark block edges indicated by arrows in FIG. 12A.

FIG. 13 is like FIG. 10, but illustrating the case where the two watermark block patterns do not have parallel axes.

FIG. 14 is like FIG. 11, but corresponding to FIG. 13.

FIG. 19 depicts a process in which a physical relationship between two printing mechanisms is changed, leading to a different sequence of offsets—before and after.

FIG. 19A shows how the offset between watermark pattern blocks can be expressed in degree terms.

DETAILED DESCRIPTION

Figure 1:
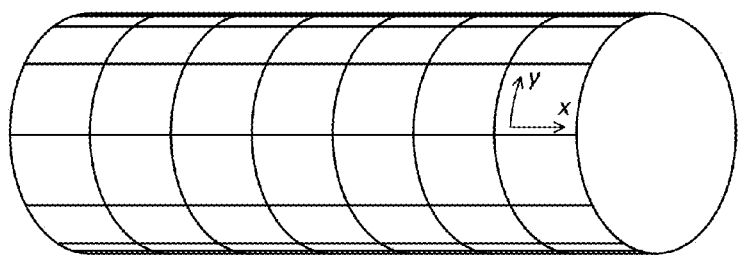
FIG. 1 shows an embossing roller that includes a tiled array of blocks, each of which encodes a steganographic spatial calibration pattern.

One aspect of the technology involves forming, on a substrate, two patterns of information-conveying tiles. One is formed by printing, and the other is formed by embossing. After the printing and embossing, spatial offset information is measured. This information geometrically relates the positions of the two patterns of tiles on the substrate. This offset information is then stored in a data structure, for later use in authenticating the substrate.

In a particular embodiment, the substrate is a printable foil. Such foils are used, e.g., to provide airtight seals on certain dairy products—such as yogurt. The printing on the foil may identify the product brand (e.g., Yoplait Lite) and the flavor (e.g., blueberry). The printing also typically includes color artwork, and may include other printed matter (e.g., an expiration date and/or a manufacturing lot number).

The first of the patterns of tiles comprises plural digital watermark tiles. Digital watermarking typically involves altering the chrominance, luminance or texture of a substrate in a subtle way so as to convey plural bits of digital data (the watermark "payload") in a manner that escapes human notice (i.e., the encoding of the payload data is steganographic).

Commonly, the watermark takes the form of a square pattern, on the order of an inch or two on a side, that is repeatedly tiled across a surface. The watermark payload may comprise 50 or 100 bits, and is typically processed with a forward error correction process (e.g., turbo, Reed-Solomon, BCH) to assure robust conveyance of data despite distortion and other error sources. This forward error correction process may yield a redundantly encoded output signal that includes, e.g., 16,384 elements. These elements have "1" or "0" values and are mapped to a 128×128 array of watermark elements ("waxels") in a single watermark tile.

Although the position, scale and orientation of the watermark tiles on the substrate are known at the time of printing, this information is unknown when processing an image of the substrate captured by a camera or other device. Yet this information must be determined in order to correctly decode the payload from the captured imagery.

To permit this information to be sleuthed, watermarks commonly also convey a spatial calibration signal. One popular calibration signal is a steganographic printed pattern that evidences a series of 48-64 peaks when the pattern is transformed into a complementary domain, such as the Fourier domain—yielding spatial frequency information. (Like the payload data, this spatial calibration signal information is encoded as a 128×128 array of component waxel elements.) The spatial frequency positions of these peaks define a geometric constellation whose characteristics are known at the time of encoding. When the camera-captured imagery is similarly transformed into the spatial frequency domain, these same peaks are evident. However, their arrangement is transformed, depending on the camera viewpoint (which affects, e.g., their position, rotation, scale and shear—generally referred to as their affine transformation). Known image matching techniques can be applied to counter-distort the captured imagery so as to restore the constellation of peaks to its original configuration. In the process, the associated imagery is similarly restored to its originally-encoded affine state.

The foregoing and additional details about watermarking are known from applicant's previous patent filings, including U.S. Pat. Nos. 8,401,224, 6,975,744, 6,973,197, 6,912,295, 6,590,996, 6,345,104, 6,307,949, 6,122,403, 20120046071, 20120078989 and 20140029809.

Returning to the illustrative embodiment, the watermark that is encoded in the substrate printing conveys payload data, but does not convey a spatial calibration signal. A spatial calibration signal is applied, instead, in a second operation, e.g. embossing.

Embossing can be achieved in a variety of manners. An illustrative embossing technique employs a roller wheel that is etched or otherwise scribed with a texture pattern, and is pressed into the substrate. Such a roller wheel is shown in FIG. 1. The tiled squares on the FIG. 1 wheel schematically represent watermark tiles—each conveying a spatial calibration signal. Of course, other texturing can also be applied by the same roller. (Texturing provides a variety of benefits. In addition to aesthetic appeal, a textured surface also simplifies material handling tasks—sheets of textured material in a stack do not adhere to each other as tenaciously as smooth media tend to do. Embossing also serves to impart a bit of rigidity to thin foils.)

Applicant's U.S. Pat. No. 6,608,919 further discusses using a shaped roller to texture media, so as to convey digital watermark information.

After the substrate is printed, it is transferred to an embossing machine, such as one employing the roller wheel of FIG. 1. Typically, the printed substrate has a width (e.g., 6 feet) that matches the width of the wheel. Thus, the position at which the substrate is introduced to the roller, in the "x" direction indicated in FIG. 1, is fairly tightly controlled, such as to within 0.5 inches, 0.2 inches, or less. However, there is much more variability in the placement of the substrate in the perpendicular "y," or circumferential, direction. Indeed, the substrate may be introduced to the roller wheel's embossing action at essentially any position along the roller wheel's circumference, which may be two feet or more.

As indicated, the embossed pattern applied by the roller wheel comprises an array of tiles conveying a spatial calibration signal. The tiles may be 1.71 inches on a side. (In this case, if the watermark pattern comprises 128×128 waxels, this works out to 75 waxels per inch.) Thus while placement of the tiled calibration signal in the "x" direction may be known to a fraction of an inch, the uncertainty of its placement in the "y" direction can be up to 1.71 inches. (Beyond 1.71 inches, the tiled calibration signal repeats.)

Figure 2:
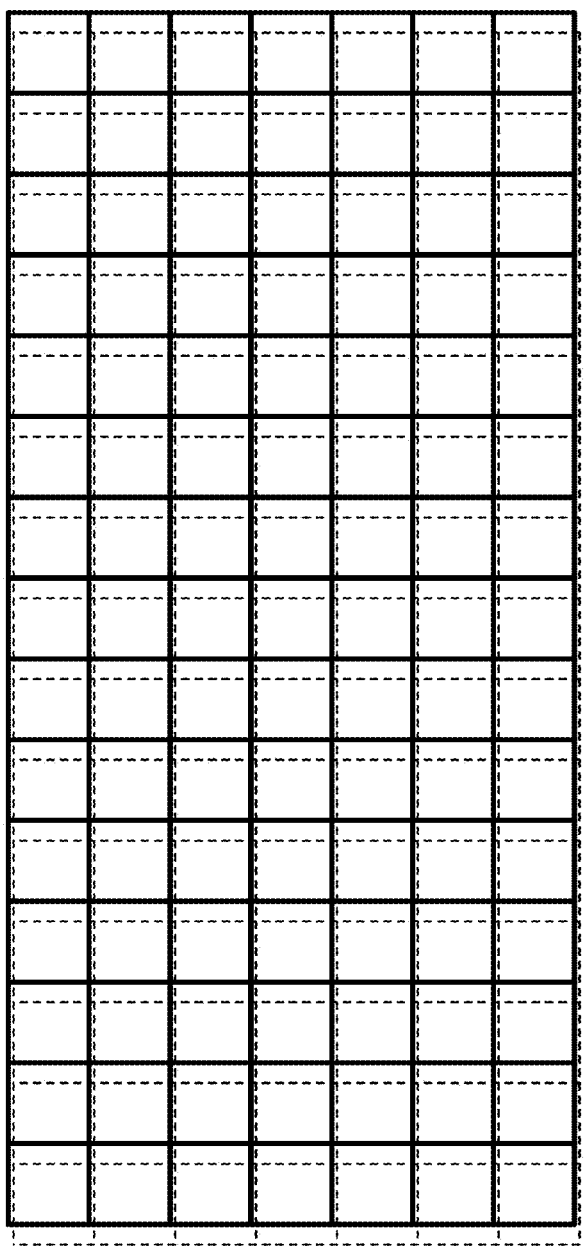
FIG. 2 shows a substrate processed with the roller of FIG. 1, including tiled watermark payload blocks shown in solid lines, and the tiled spatial calibration blocks shown in dashed lines.

FIG. 2 conceptually illustrates a substrate after it has been both printed and embossed. The printing includes a tiled watermark pattern (indicated by solid lines) that conveys plural-bit payload data. The embossing included a tiled watermark pattern (indicated by dashed lines) that conveys spatial calibration information. (Other printing—such as product artwork—is not shown in FIG. 2.)

The FIG. 2 substrate is next processed to determine the spatial offset between the two patterns. This can be done by various means, including manual identification of reference points in the printed and embossed indicia, and measuring the distance between these points. A more preferred arrangement involves capturing an image of the substrate, under oblique illumination (so that the texture-encoded information is more apparent). This image is then analyzed to determine the position of reference locations in both the printed pattern and in the embossed pattern. For square tiles, the reference location is commonly the upper left corner of a tile, although other locations can naturally be used. An exhaustive search can be used, as more particularly discussed in connection with the authentication operation, below.

Figure 2A:
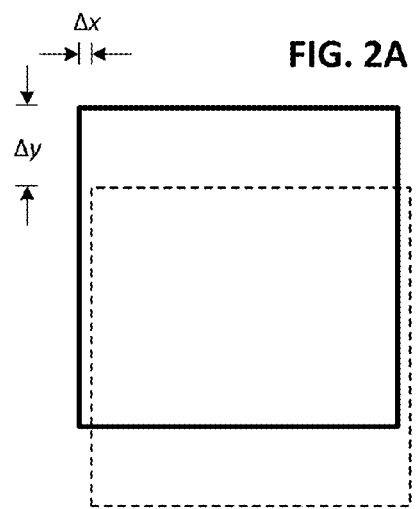
FIG. 2A shows how the offset between the watermark payload and calibration signals can be represented by offsets in x- and y-directions.

As indicated by FIG. 2A, the offset information can be identified by two data: an offset in the "x" direction, and an offset in the "y" direction. FIG. 2A shows the common case, in which the former is smaller than the latter.

Once this offset information is determined, it is stored in a data structure, such as a look-up table or database. Such a data structure is conceptually shown in FIG. 3.

The illustrated data structure is arranged as a series of records (rows). The first column in each row stores the watermark payload. This is the 50-100 bits of information encoded in the printing. Since this information is steganographic, it can be changed for each substrate, simply by adding the (variable) watermark pattern to the (fixed) overt artwork pattern. Data corresponding to the watermark+artwork composite image then drives a printing apparatus, e.g., an inkjet array. (The substrate may be 6 feet in width and 20 feet in length, and printed with hundreds of yogurt lids, e.g., for Yoplait blueberry yogurt.) In the described arrangement, the sheets of substrate are serialized—each conveying a different watermark payload.

The second column in the data structure contains metadata. This can identify the artwork printed on the substrate (e.g., for Yoplait blueberry yogurt), as well as other information—such as the date the substrate was printed and textured. Information in this field may be populated by the company that produces the foil yogurt lids, and other information may be populated by the yogurt manufacturer. This latter party can add information such as the plant at which the lid was applied to the yogurt container, the lot number identifying that batch of yogurt, processing date, expiration date, etc.

The third and fourth columns in the illustrated data structure contain the offset information, e.g., in "x" and "y" directions—as indicated by FIG. 2A. This information is shown as expressed in waxels (each waxel measures one-$75^{th}$ of an inch on a side in the illustrative embodiment), but other measures—such as inches—can naturally be employed.

After the substrate has been processed as described above, it is cut to the customer's requirements (e.g., to form yogurt lids), and is shipped to the customer. The customer, in turn, uses the cut substrate stock to package its products. (As noted above, the customer may also add additional information to the FIG. 3 data structure.) Eventually, the packaged items (e.g., yogurt) are boxed, sent to distribution warehouses, and eventually appear on store shelves.

At any point in the distribution and retail processes, the authenticity of a suspect item can be checked by essentially repeating the process described above for determining spatial offset between the two tiled patterns. In one such arrangement, imagery is captured from the textured foil of the packaged product. This imagery includes both the spatial calibration information (embodied in the embossing) and the payload information (embodied in the printing). The image capture can be performed by a smartphone.

This smartphone is equipped with authentication application software (e.g., an iPhone "app") that includes a watermark detector. This watermark detector detects the spatial calibration signal in the image, and determines the distortion of the known constellation of spatial frequency peaks. By so doing, the detector thereby discerns the affine distortion of the substrate as depicted in the image. The image is affine-transformed to counteract this distortion.

After this affine counter-distortion, the image depicts the substrate with its original scale and orientation, permitting the watermark payload information to be recovered. But first the location of the watermark payload tile within the image must be determined. Else, the payload information decoded from the image will be garbage.

Fortunately, the location of the watermark payload is not a complete mystery. Because the substrate was introduced to the embossing roller wheel at an "x" position that was known within a fraction of an inch, an exhaustive search can be conducted for the payload-bearing watermark, within a bounded region.

Figures 3, 4:
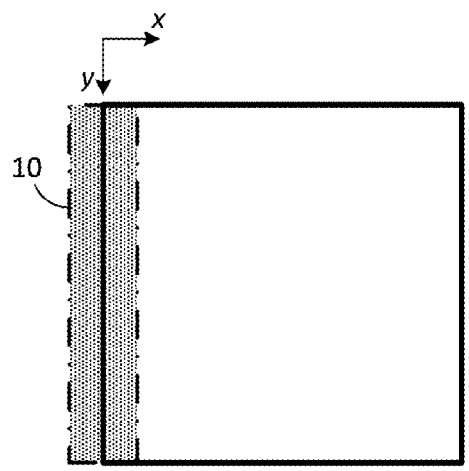
FIG. 3 conceptually illustrates a data structure that can be used in embodiments of the present technology.
FIG. 4 shows a bounded search space (10) that can be employed in searching for the watermark payload origin.

An exemplary bounded region 10 is shown in FIG. 4. While this region spans the full tile dimension in the "y" direction (i.e., 128 waxels, or 1.71 inches), it is confined in the "x" direction. The particular bound will depend on the tolerance of the substrate's placement relative to the roller wheel. If the substrate is reliably introduced to the wheel with an error of +/−0.2 inches, then the search space can be bounded in the "x" direction to +/−0.2 inches (or +/−15 waxels).

An illustrative search process starts by assuming that the payload tile and the (earlier-identified) calibration tile are exactly aligned. The detector software then attempts to decode a payload from the thus-aligned payload tile. Error checking in the detector (e.g., based on the forward error correction technique applied during decoding) indicates whether this is the correct alignment, or whether the decoded output data is garbage.

The detector next assumes that the payload tile is coincident with the calibration tile in the "x" direction, but is offset by one waxel in the "y" direction. Another trial decoding is attempted. If garbage is again produced, the process is repeated—this time with a further one waxel offset in the "y" direction (i.e., to a net of two waxels). This process is repeated until all of the (x,y) offsets in the range (0,0)-(0,127) are tried. (After 127 waxels of offset in the "y" direction, a new tile appears, so this is the same as the originally-tried (0,0) offset.)

Next, the process is repeated, this time assuming an "x" offset of +1 waxel. Again, the detector attempts all "y" offsets between 0 and 127. If a successful decode is not achieved, the process is repeated, this time assuming an "x" offset of −1 waxel.

In like fashion, the detector successively tries all combinations of "x" offsets in the range of −15 to +15 waxels, and "y" offsets in the range of 0 to 127 waxels, until one yields valid data output (as indicated by the error detection process).

Once the offset of the printed payload watermark tile, relative to the embossed calibration signal watermark tile, is determined to within one waxel, a further exhaustive search can be done to identify the offset to sub-waxel precision, e.g., 0.1 waxels. This search process proceeds by evaluating a bit error rate of the decoded payload information at various trial offsets. (Due to the forward error correction, the detector can extract the correct 50-100 bit payload despite errors in hundreds of the 32,000+ waxels of the payload tile. Different trial sub-waxel positions for the payload tile are tried, to minimize these errors.)

From the foregoing, it will be recognized that the embossed spatial calibration signal provides all of the affine transform information needed to decode the watermark payload—what then remains is the translation of the payload watermark relative to the spatial calibration watermark.

Once the offset information is determined, the payload is decoded from the printed watermark. The payload may have the value "6FA245." The smartphone software then looks-up this payload value in the data structure of FIG. 3. (A copy of this data structure may be resident in the smartphone, or the phone may access a remote data structure, e.g., in the cloud.) It finds this payload appears in lids for Yoplait peach yogurt, produced at Hayworth, Calif., as Lot No. 20130509C. It further finds that the substrate from which this lid was formed was earlier determined to have an offset of 2.1 waxels in the "x" direction, and 17.2 waxels in the "y" direction.

The offset information obtained from the data structure is then compared with the offset information discerned by the just-described process. If they agree within some tolerance (e.g., 0.8 waxels—the particular tolerance will depend on the application), then the product has passed the authentication test. If one or both of the offset data are outside of this tolerance, then it appears the product is not authentic. In either case, a corresponding output indication is provided from the smartphone.

In addition to the just-described authentication procedure, it will be recognized that the watermark applied in the printing operation has less information content than conventional watermarks, because it lacks the usual spatial calibration information that is commonly conveyed. Since less information is conveyed, the information that is conveyed can be conveyed with greater robustness than usual—since the full information-carrying capacity of the watermark channel is dedicated to the payload information.

Alternatively, instead of increasing the robustness of the payload transmission, the absence of the spatial calibration information in the printed imagery allows the watermark to be better hidden. (The calibration information has some spatial regularity that makes it more difficult to conceal in print than the more random payload information. Its absence makes the printed watermark more imperceptible.)

Further Remarks

Having described and illustrated the principles of the just-described technology with reference to specific implementations, it will be recognized that such technology can be implemented in many other, different, forms.

For example, while the description spoke of the printing being applied first, and the embossing thereafter, this is not essential. In another embodiment, the substrate can be embossed first, and printed second.

Similarly, while the description spoke of the printed watermark pattern conveying payload information without calibration information, and the embossed watermark pattern conveying calibration information without payload information, this is not necessary. In other arrangements, the printed watermark can also include calibration information, and/or the embossed watermark can also include payload information.

Moreover, it is not necessary that the spatial calibration information be steganographically encoded. The embossing may apply an overt tiled pattern—a particular location in which serves as a marker point from which offset of the printed watermark is determined.

Nor is it required that the payload-bearing watermark signal be printed. The roles of the printing and embossing can be swapped, with the former conveying calibration information, and the latter conveying payload information. (As a practical matter, the texture on the embossing roller is difficult to change—typically requiring that the roller wheel be replaced. In contrast, printing is easy to change. In most embodiments, it is thus desirable for the payload information to be applied by printing, since this allows the payload information to be changed from run to run (or even to be serialized between sheets within a particular manufacturing run).)

The exemplary embodiment described the smartphone checking the data structure to learn the offset information determined during production of the substrate (i.e., the reference offset information), and comparing this with the offset information determined from a suspect product sample. In other embodiments, the smartphone does not access the reference offset information. Instead, the phone sends the offset information determined from the suspect product to a cloud processor. The cloud processor does the comparison, and returns a simple valid/invalid authentication response to the smartphone.

The detailed procedure by which the smartphone determined the spatial offset between printing and texturing can likewise be used earlier, e.g., at the manufacturing stage, to obtain such offset information for entry in the FIG. 3 data structure.

Figure 5A:
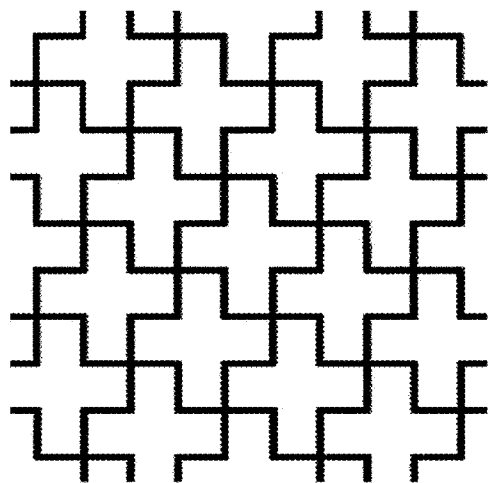
FIGS. 5A-5D show alternate tiling patterns.
Figure 5B:
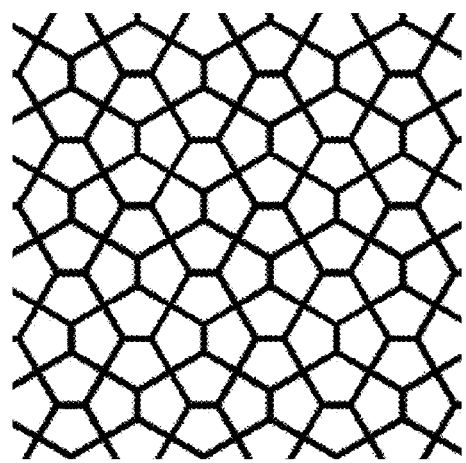
Figure 5C:
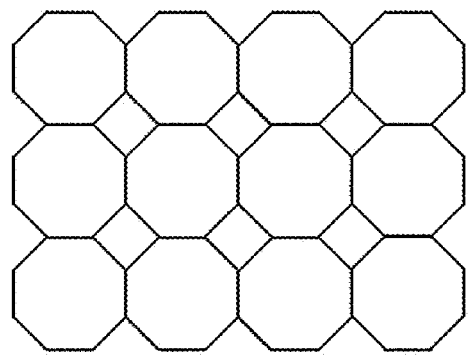
Figure 5D:
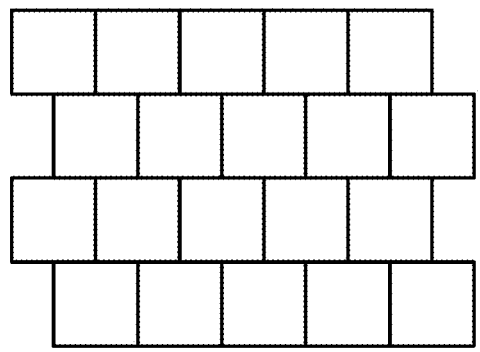

While the exemplary embodiment assumed that the tiles are square, this need not be the case. FIGS. 5A-5D show alternate tiling arrangements. (FIGS. 5A-5C are examples of tessellated tile arrangements—tessellation referring to arrangements with no overlaps and no gaps; some mathematicians do not regard FIG. 5D as a tessellated pattern.) Note that it is not necessary for all of the tiles to have the same shape—or even the same orientation—provided that the detector knows sufficient information about the tiling pattern.

Moreover, it is not strictly necessary for the tiles to be arranged with no gaps—provided the application allows for certain areas of the substrate to have no payload- and/or spatial calibration-information.

Figure 6:
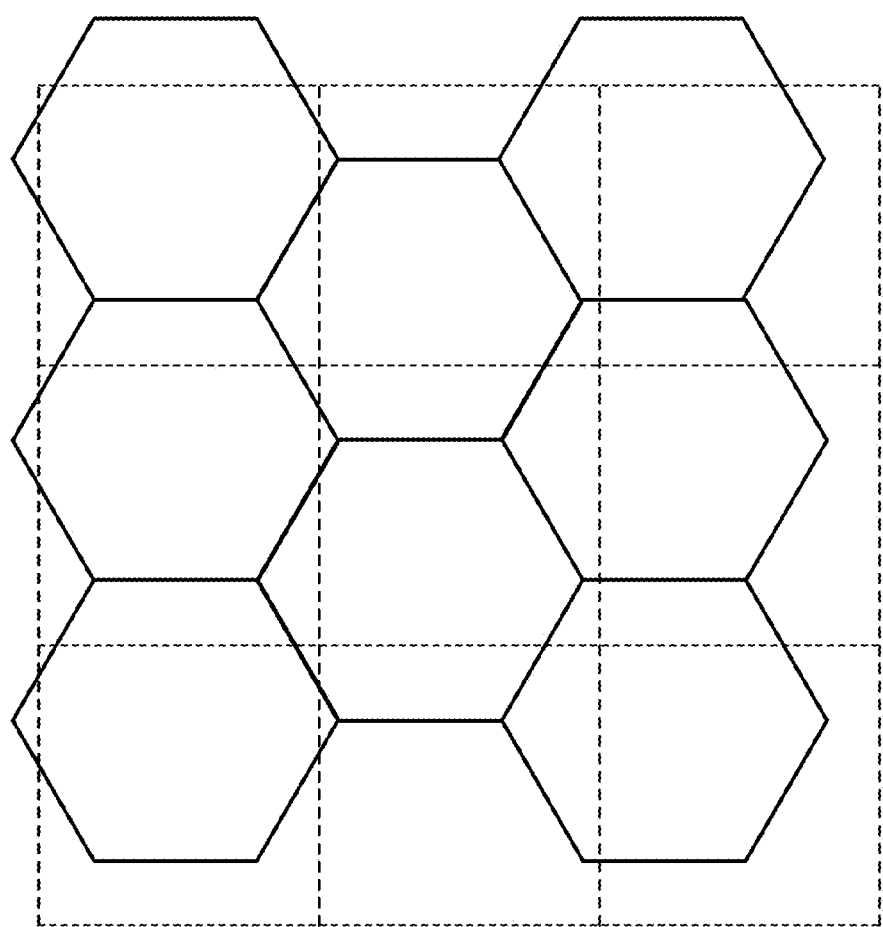
FIG. 6 illustrates that a watermark payload pattern (in solid lines) can use a tile shape different than a calibration signal (in dashed lines).

As shown in FIG. 6, it is not even necessary for the payload-conveying watermark (shown in solid lines) to have the same shape as the watermark tile that conveys the spatial calibration information (shown in dashed lines).

Figure 6A:
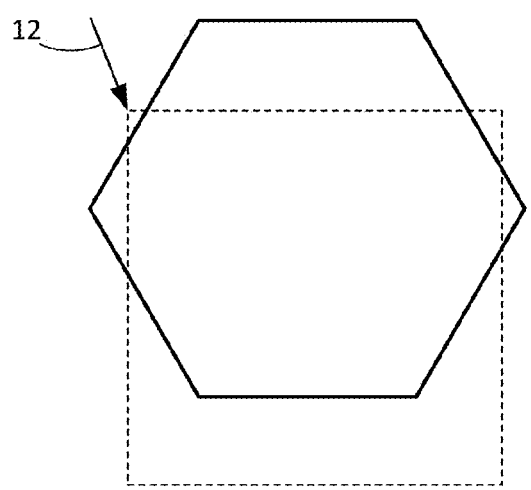
FIG. 6A shows one manner of determining an offset between the watermark payload and calibration signals of FIG. 6, using a vector form of representation.

FIG. 6A illustrates that the offset information can be represented as a vector 12. The vector has a length and an angular orientation. These two data can be used in lieu of the "x" and "y" forms of offset representation discussed previously. The indicated vector has its origin at the upper left corner of an imaginary bounding box around the (printed) hexagonal watermark tile, and its endpoint at the upper left corner of the (embossed) square watermark tile.

While the described offset information comprises two data, e.g., "x" and "y" offset, or vector length and angle, storage of both is not necessary. For example, in some embodiments only the "y" offset, or angle, may be stored, and this datum alone may be checked as an indicia as authenticity.

The detailed embodiment accessed the relevant row in the data structure by reference to the decoded watermark payload. In other embodiments, the relevant row can be determined otherwise, e.g., by reference to lot number information printed on the substrate.

While the foregoing description has considered foil substrates, it will be recognized that this technology can be used with any material. Paper and plastics are two alternatives.

These variations similarly apply to the other aspects of the presently-detailed technology, which are detailed below.

Another Aspect

As with the other arrangements detailed herein, the following aspect of the present technology can be used with all manner of printing apparatus. For sake of an example, a web offset press is discussed. However, it should be recognized that any other type of arrangement can be used, e.g., xerographic, cut-sheet, etc., etc.

Figure 7:
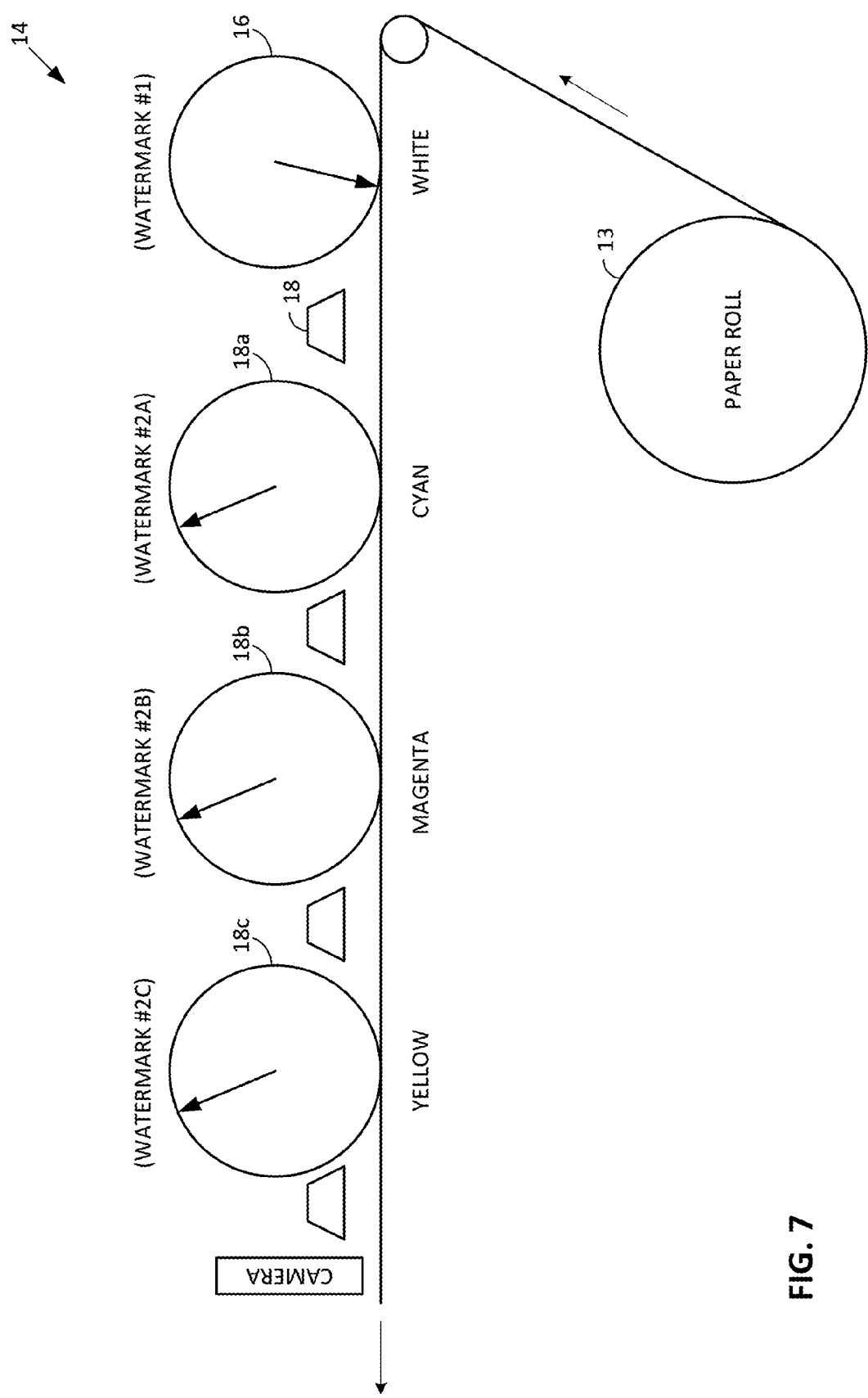
FIG. 7 shows an illustrative printing apparatus in accordance with one example of the present technology.

Referring to FIG. 7, a roll of paper 13 feeds the offset press 14. The paper substrate is introduced to the apparatus 14 by a feed mechanism (not particularly shown) and into a first portion that includes a first rotary printing mechanism 16. This mechanism prepares the substrate for later ink printing or material handling. In one illustrative embodiment, the mechanism 16 comprises a textured wheel that applies a watermark-encoding texture to the substrate. In another, the mechanism applies a base layer of patterned material (e.g., a conditioner—such as a gloss layer, or white ink) to the substrate, onto which patterned layers of ink are thereafter applied.

Following the first portion (and subsequent portions) is a dryer component 18 that helps dry or cure the processing applied by the first portion. Component 18 can be, e.g., an ultraviolet lamp or a thermal heater unit.

The apparatus next includes a sequence of further print mechanisms (e.g., cylinders) 18a-18c, which successively apply layers of cyan, magenta, and yellow inks (and often black, not shown), to yield a finished printed web. After such processing, the printed web is typically cut into distinct items, e.g., product labels, magazine pages, etc., by a cutter assembly (not shown).

As is familiar, such a press employs printing plates (e.g., of aluminum) that are wrapped around the cylinders. The plates are typically etched with the pattern of artwork (e.g., of cyan, magenta, yellow, and black) to be printed to the web.

The printing plates employed by mechanisms 18a-18c must lay down their respective patterns of ink in spatial alignment with each other (i.e., co-registered) to yield a correctly-printed color item. This is indicated in FIG. 7, by the parallel arrows, indicating that the depicted rotary mechanisms 18a-18c are in the same rotary phase state. These mechanisms are synchronized in their operation, such as by a common drive mechanism, slaved servo-motors, etc.

The processing (e.g., ink or texture) applied by the first mechanism 16, however, does not need to be spatially aligned with the processing applied by the mechanisms 18a-18c. This is indicated by the arrow in the right-most wheel that points in a different direction than the other three arrows.

In this illustrated arrangement, a plate on mechanism 16 applies a first watermark pattern to the web. One or more of the plates on mechanisms 18a-c applies a second watermark pattern to the web. This second watermark pattern can be multi-color (in which case the plates on multiple of the cylinders may be involved), or the watermark can be applied in just a single color—such as yellow, in which case just a single plate can be involved.

Figure 8:
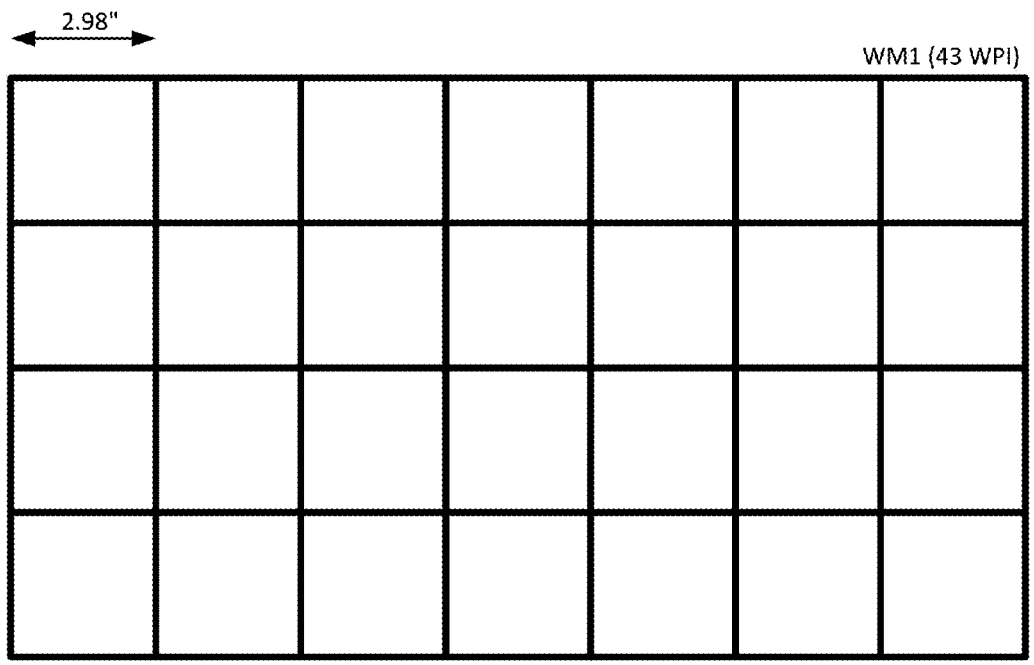
FIGS. 8 and 9 show arrays of first and second watermark block patterns that can be printed on a substrate.
Figure 9:
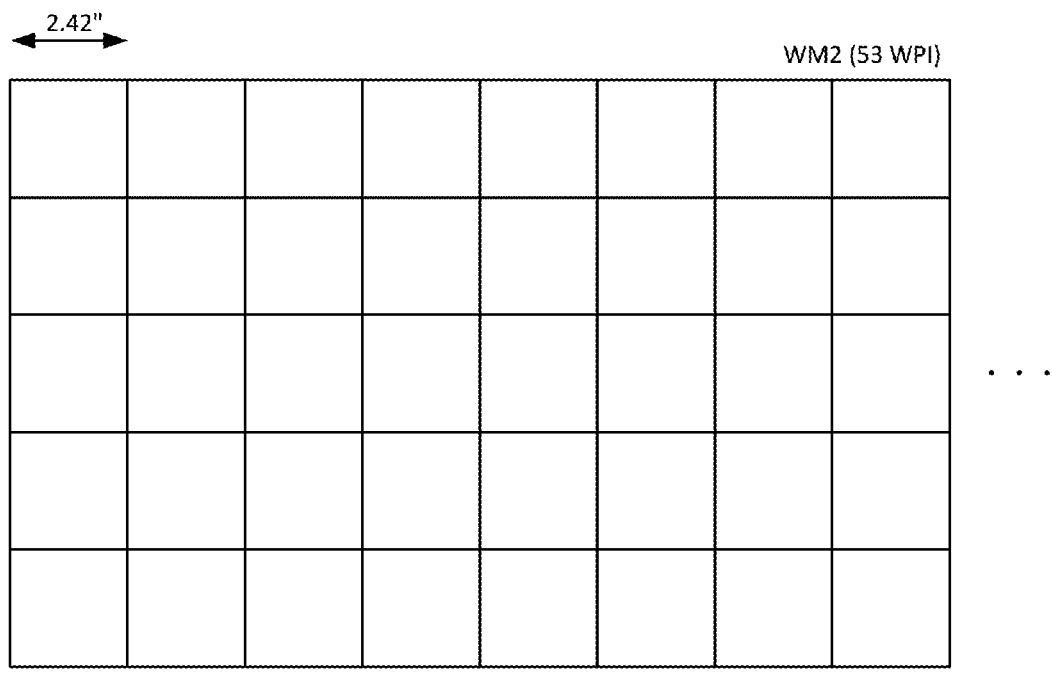

FIGS. 8 and 9 show excerpts of the watermark patterns applied by these mechanisms (these patterns continue to the right, off the page). In FIG. 8, the watermark pattern comprises a tiled array of adjoining blocks, each about 2.98 inches on a side. More particularly, each block of this first watermark pattern (WM1) comprises a 128×128 array of watermark elements ("waxels"). The WM1 block is printed at a resolution of 43 watermark-elements-per-inch (WPI), yielding the 2.98" periodicity (128/43=2.98).

Similarly, in FIG. 9, the tiled WM2 blocks are each about 2.42 inches on a side. This again corresponds to a 128×128 array of watermark elements, but this time formed at a resolution of 53 WPI (128/53=2.42).

FIG. 10 shows the web after it has been printed with the two watermark patterns. (It should be understood that "print," as used throughout this specification, includes processing that imparts a signal to a substrate—even if no ink is used. For example, texturing is regarded as a type of printing.)

It will be seen that the WM1 and WM2 blocks overlay each other in a spatial relationship that varies at different positions on the web. FIG. 11 further illustrates this phenomenon.

The "origin" of each watermark block is regarded as the upper left corner (in the present discussion). In the upper left of FIG. 11, the WM1 and WM2 blocks have coincident upper corner locations. There is an offset of zero inches. Elsewhere, however, neighboring pairs of WM1/WM2 watermarks have spatial offsets that vary with position on the web.

Consider the top left bold arrow in FIG. 11. This arrow depicts the offset of a WM1 block towards its nearest neighbor WM2 block. The length of this offset is 1.85 inches. In this case, the offset is entirely in the horizontal direction, which is the long dimension of the web in the depicted arrangement. This may be regarded as the "y" dimension.

Examining successive blocks to the right, the next bold arrow shows that the offset from the next WM1 block to its nearest neighbor is 1.3 inches in the "y" direction. Similarly with the 0.73" and 0.17" inch measurements of the adjoining WM1 blocks.

The next arrow, marked 2.03" inches in FIG. 11, shows the offset between the origin of a WM1 block and the origin of its nearest-neighboring WM2 block. Note that there is a closer origin of a WM2 block in the opposite, negative-y, direction. However, for expository convenience, all offsets are regarded as being in the positive-y direction (i.e., pointing to the origin of the WM2 block nearest to the right).

The web continues to the right, off the page (as shown by the " . . . " marking). The sequence of offsets shown in FIG. 11 similarly continues off the page. The illustrated sequence is {0, 1.85, 1.3, 0.73, 0.17, 2.03, 1.46 . . . }. The sequence continues off the page with values { . . . 0.90, 0.34, 2.19, 1.63 . . . }.

This progression is a unique mathematical series, determined by the dimensions of the two component watermark blocks, WM1 and WM2. FIGS. 12A and 12B show the derivation of this sequence.

The first column of FIG. 12A shows the position—in inches—of the origin of each successive WM1 block, in the "y"-direction. The second column does likewise, but for the WM2 blocks. The arrows in FIG. 12A show the nearest-neighbor pairs (e.g., for the WM1 block at y-location 8.93 inches, its nearest-neighboring WM2 block has its origin at y-location 9.66 inches).

FIG. 12B repeats the first column of FIG. 6A, and then shows the difference—in inches—between the paired WM1/WM2 blocks. In the case of the WM1 block at y-location 8.93", this offset distance is 0.73". This figure is shown near the top center of FIG. 11.

In this example, the two watermark WM blocks are characterised by measurements (e.g., 43 and 53 watermark-elements-per-inch) that have no common positive integer factor; they are relative primes. This helps extend the length of web that can be produced before the series of offset values (e.g., in FIG. 12B) starts repeating.

As shown in FIG. 12B, after 43 adjoining tiles of the WM1 block, the offset between neighboring WM1 and WM2 blocks returns back to zero. The cycle then repeats with further blocks after these first 43. The overlap pattern of FIG. 10 has a periodicity of 43 WM1 blocks in the "y"-direction. (This periodicity also equates to 53 WM2 blocks.)

If the cylinder of print mechanism 16 (which lays down the tiled first watermark blocks) is of the same circumference as the cylinder of a print mechanism 18 (which lays down the tiled second watermark blocks), then a full turn of one corresponds to a full turn of the other. In this case, the two watermark patterns will repeat their sequence of spatial watermark offsets once for each full rotation of these cylinders.

Typically (although not necessarily), each of the printing plates is patterned to form an integral number of watermark blocks in the y-direction. In the discussed arrangement, the plate on mechanism 16 has 43 of the 2.98" WM1 blocks tiled across its y-dimension. (The plate on one or more of mechanisms 18 likewise has 53 of the 2.42" WM2 blocks tiled across its y-dimension.) Each plate is thus 128" across. That is, each plated-cylinder has a circumference of 128." (In actual practice, the circumference of each cylinder may be fixed, e.g., by the manufacturer, and the watermark measurements are adapted to the particular circumference at hand.)

When the watermarks applied by the press are later decoded, positions of their origins can reliably be determined to an accuracy of 0.01" inch or better. Since the range of possible WM1-WM2 "y"-offsets ranges from 0 inches to 2.41 inches, the universe of possible "y"-offsets that reliably can be determined number 242 (i.e., 0, 0.01, 0.02, . . . 2.40, 2.41). However, as shown in FIG. 12B, only a subset of this universe of possible "y"-direction offsets is employed in the example just-considered: only 43 of the 242 possibilities.

Increasing the watermark-per-inch measurement allows more of this universe of possible values to be utilized. However, there's another approach that yields a greater number of different "y" (and "x") offsets.

It will be recognized that the paired-block spatial offsets in the horizontal direction (i.e., in the "y"-direction) are common for all WM1 tiles in each vertical column of tiles. For example, the 1.85" offset shown in FIG. 11 is the same for WM1 tiles in that vertical column.

Similarly, the paired-block spatial offsets in the vertical direction (i.e., in the "x"-direction) are common for all WM1 tiles in each horizontal row of tiles.

This commonality, in "x"- and "y"-direction offsets for many of the paired blocks on the printed web, limits the number of available offsets.

By inclining one of the patterns of tiled watermark blocks, a much larger set of offsets arises. Such an arrangement is shown in FIGS. 13 and 14. The pattern of WM1 blocks is unchanged, compared to FIGS. 8 and 9. However, the pattern of WM2 blocks is inclined ten degrees, relative to the earlier figures. Comparison of FIG. 14 with FIG. 11 shows the greater variety in offsets achieved by inclining one of the tiled patterns.

By inclining one of the watermark patterns in this manner, different of the WM1/WM2 paired-blocks can be distinguished from each other—even if both of the blocks have the same measurement (e.g., are printed at 43 WPI, with a block width of 2.98"). Inclining one pattern relative to the other is also useful if one of the block measurements shares a common integer factor with the other (e.g., if WM1 has a block width of 6" and WM2 has a block width of 4"). Without inclining, such overlaid pattern would repeat after 2 WM1 blocks (and 3 WM2 blocks). But by inclining one pattern, a great number of differently-offset paired-blocks can be printed on the web before the pattern cycles and repeats.

Nothing has yet been said about the payloads of WM1 and WM2. In some embodiments, no payload is used. Instead, one or both can simply be a noise pattern. The watermark detector can search captured imagery for the noise patterns characterizing WM 1 and/or WM2, and discern their spatial offset. (If two product images are found to have different spatial offsets, then it is certain that they are not two images of the same product.)

More typically, one or both of the watermarks conveys a multi-bit payload. One or both can convey, e.g., a GTIN number that identifies that product that will be packaged in the printed substrate. (GTIN is a Global Trade Identifier Number—the information that is commonly encoded in product barcodes.) Decoding the payload thus allows for look-up of associated product information (name, weight, price, etc.).

Figure 15:
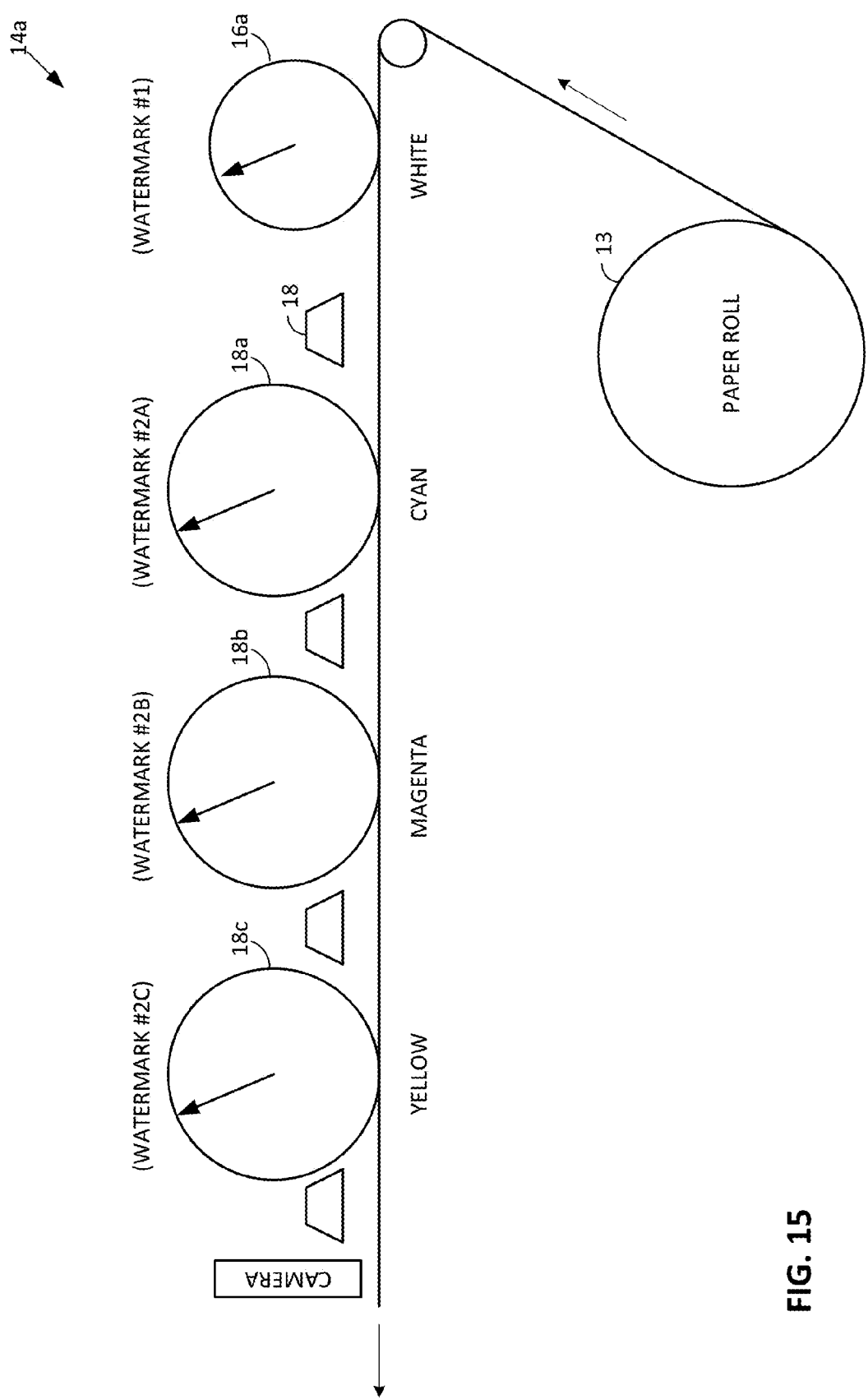
FIG. 15 shows an apparatus like that depicted in FIG. 7, but with one of the print cylinders being a different size.

FIG. 15 shows a different embodiment. This is essentially the same as the FIG. 7 embodiment, except the rotary mechanism 16a is smaller than the rotary mechanisms 18a-18c. (In a variant embodiment, rotary mechanism 16a is larger than mechanisms 18a-18c.)

One way different sizing of these printing mechanisms can be effectively achieved is to use rubber blankets of different thicknesses in mechanisms 16a vs. 18a-18c. Such technique yields small differences in cylinder circumference, e.g., less than 2%, and in some instances less than 1%, 0.5%, 0.2%, or 0.05%. (The smaller the difference, the more web is printed before the two patterns spatially re-synchronize.)

A consequence of sizing the rotary mechanisms differently is that a full rotation of mechanism 16a no longer corresponds to a full rotation of mechanisms 18a-18c.

In the example given earlier, in which mechanism 16 applies 43 blocks of WM1 in a single turn, and mechanism 18 applies 53 blocks of WM2 in a single turn, the set of differently-offset paired WM1/WM2 blocks repeats with each turn. That is, after a full turn of the mechanisms, the left edge of the paired WM1/WM2 blocks again coincides (as shown at the left edge of FIGS. 10 and 11). In FIG. 15, this is no longer the case.

In the example earlier-given, the rotary cylinders each had a circumference of 128". This distance spanned the 43 blocks of WM1 applied by mechanism 16 (each block being 2.98" on a side). Consider what happens if the cylinder of mechanism 16a is just slightly smaller, so that it spans only 42 blocks of WM1. That is, that the cylinder is 125.0233" in circumference.

In this case, the cylinder of mechanism 16a returns to its starting position after 125.0233" inches of web have been printed. The other cylinders, in contrast, won't return to their original starting positions until 128" of web have been printed.

Figure 16:
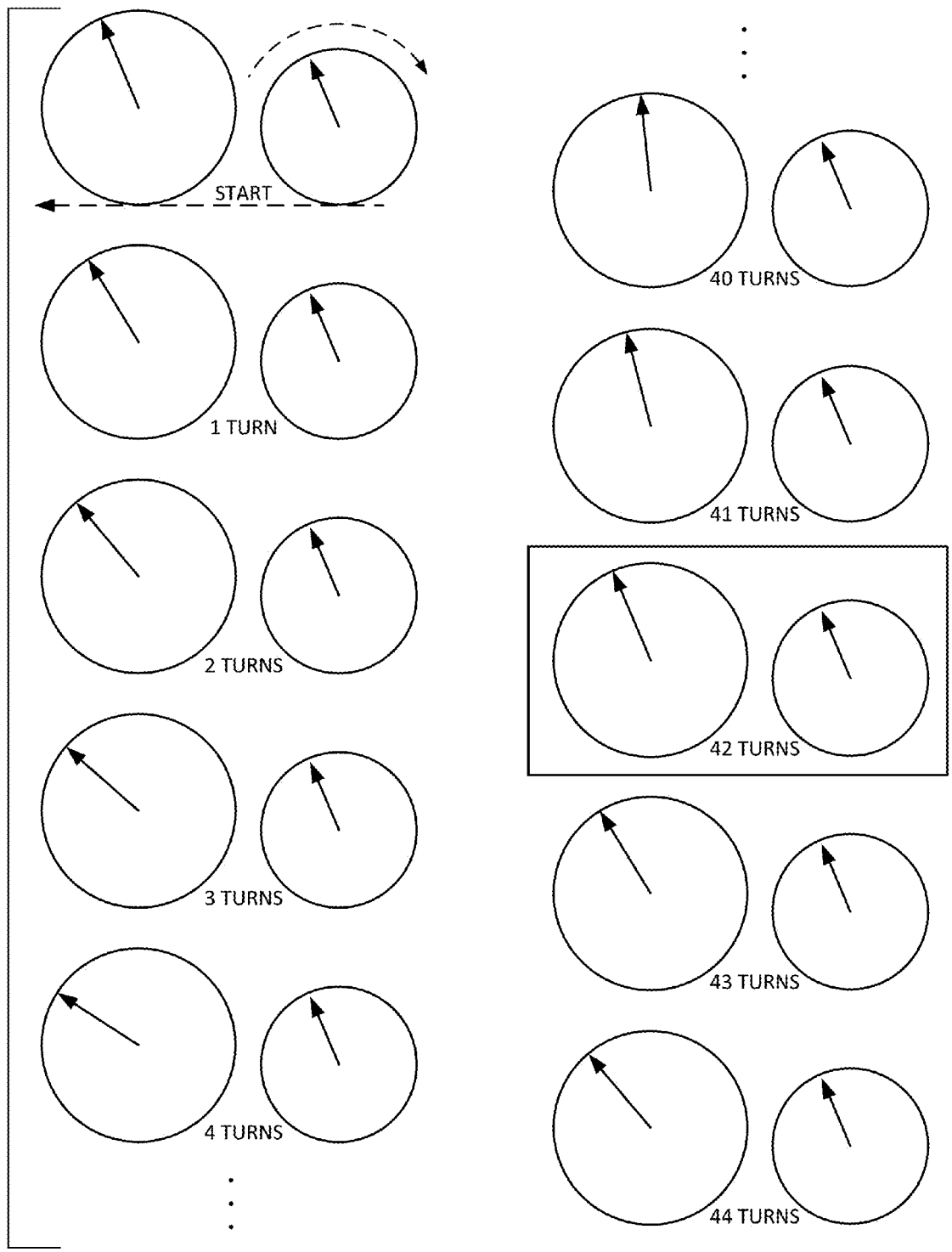
FIG. 16 shows a variety of different phase relationships between two of the print cylinders in FIG. 15.

FIG. 15 shows the white and cyan cylinders both starting at the same orientation (phase state), as indicated by the parallel arrows. FIG. 16 shows the position of the cyan cylinder at successive full rotations of the white cylinder. The cyan cylinder—with its larger circumference—doesn't keep up. Each full turn of the white cylinder causes the cyan cylinder to lag 8.37 degrees further behind. Eventually, after 42 turns of the white cylinder, the cyan cylinder catches up—from behind—and reaches the same phase state. Again, the left edges of their printing plates align, and the left edges of the WM1 and WM2 blocks coincide. This occurs after 42*125.0233", or after 437 feet of web have been printed.

Very much longer runs of web can be printed without the cylinders returning into alignment, if different measurements are used. Consider a white cylinder that has 54 of the 2.98" (43 WPI) blocks around its circumference; i.e., a circumference of 160.744". Consider a cyan cylinder that has 57 of the smaller, 2.42" (53 WPI) blocks around its circumference; i.e., a circumference of 137.66." (In this case, the cyan cylinder is smaller than the white cylinder.)

When the white cylinder has completed its first 360 degrees of rotation, the cyan cylinder has made a full rotation, and then some. In particular, it is at an orientation of 360*(160.744/137.66) or 420.37 degrees (i.e., 60.37 degrees). After two rotations of the white cylinder, the cyan cylinder is at 120.73 degrees. This progression continues—with the cyan cylinder gaining a further 60.37 degrees for each rotation of the white cylinder—until the white cylinder has made 5 turns, and the cyan cylinder is at an orientation of 301.84 degrees. At 6 turns of the white cylinder, however, the cyan cylinder has advanced to an orientation of 2.2 degrees. The cylinders failed to synchronize.

Indeed, they fail to synchronize until the white cylinder has made 817 rotations. The two cylinders then are both oriented at 0 degrees, and the cycle repeats. However, during these 817 rotations of the white cylinder, 817*160.744" of web have been printed—or 10,944 feet, a bit over two miles. That's a long run of substrate before repetition sets in.

In that 10,944 feet of material, there are 44,118 adjoining WM1 blocks in each row of the y-direction. (The number of rows depends on the width of the web.) These 44,118 adjoining WM1 blocks have varying spatial offsets with their nearest-neighbor-to-the-right WM2 blocks, but those offsets are drawn from a limited universe of 241 possible values in the y-direction (and a like number in the x-direction), due to the 0.01" measurement accuracy of the watermark decoder.

Given the large number of blocks involved, there is a risk that one WM1/WM2 pair of blocks will have the same x- and y-offsets as another WM1/WM2 pair of blocks, along the length of the printed web (before the pattern repeats—10,944 feet in the above example).

This risk can be reduced by inclining one watermark pattern, as discussed above. And the watermark measurements (e.g., WPI and number of waxels in each block) can sometimes be engineered so as to bring this risk to zero. But it is often preferable to introduce another factor by which different parts of the printed substrate can be distinguished—other than these offset data.

In one particular arrangement, the payloads of the watermarks can provide such a distinguishing feature.

Figure 17:
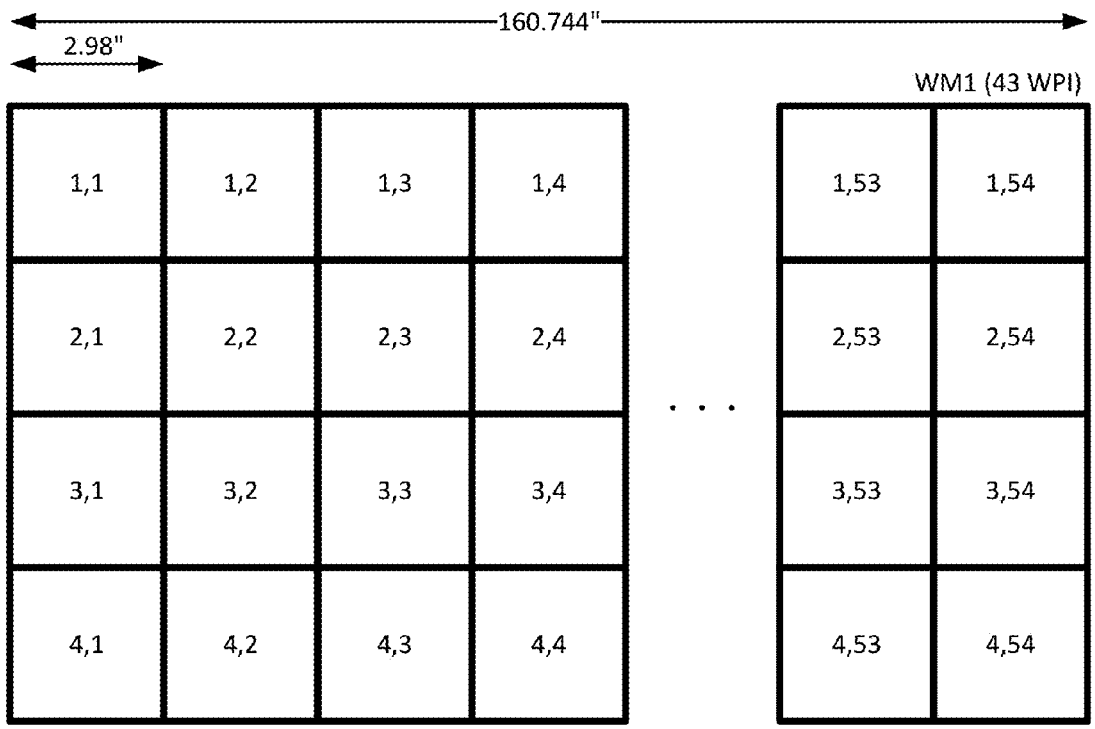
FIG. 17 illustrates how tiled WM1 blocks on a printing plate can convey payloads indicating their row/column position on the plate.
Figure 18:
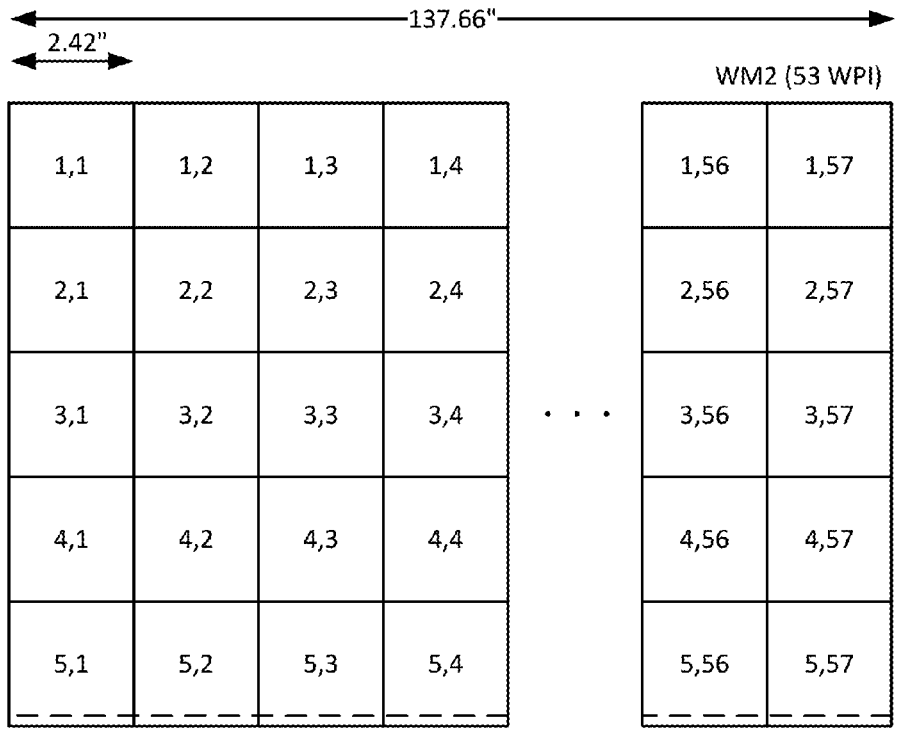
FIG. 18 is like FIG. 17, but for tiled WM2 blocks.

FIGS. 17 and 18 illustrate one such arrangement. FIG. 17 shows a printing plate for the white cylinder in the foregoing example, applying 54 blocks of WM1 in a single rotation of the white cylinder. FIG. 18 is similar, but for the cyan plate—applying 57 of the smaller blocks of WM2 in a single rotation of the cyan cylinder. (In this illustration, the web is 11.92" in width. This spans 4 full WM1 tiles, but a fractional number—4.9—of WM2 blocks. The actual edge of the WM2 printing plate is shown in dashed lines in FIG. 18.)

Each watermark block encodes a different payload. In addition to GTIN data (which is common across all watermark blocks), each block includes its {row, column} position on the printing plate.

In determining whether two product images depict different instances of the same product, or simply two images of a single instance of the product, a software application applies watermark decoding techniques (e.g., as detailed elsewhere in this specification, and incorporated-by-reference patent documents) to each of the images, to derive four data. From the first image it extracts the offset-between the two watermarks in the x-direction (using the WM1 block nearest the center of the image—if the image spans several such blocks), the similar offset in the y-direction, the {row/column} payload from the WM1 watermark, and the {row/column} payload from the WM2 watermark. The software then does likewise for the second image. If these two sets of four data differ in any respect, then the software concludes the two images depict different instances of the product. Suitable action can then be taken (e.g., awarding the image-submitter a prize).

If the two sets of four data match, then these two images both depict the same instance of the product—to an extremely high certainty. (In the case just-given, the 10,944 feet of uniquely-printed web spans 44,118 columns of WM1 blocks, and 3+ rows of WM2 blocks (giving allowance for the inclined orientation of WM2 blocks), or a total of 130,000+ uniquely-distinguishable WM1/WM2 neighbor pairs. While web substrate longer than 10,944 feet may be printed for some items—giving rise to repetition in all four data, the chance that two images depict items packaged from corresponding points in two such lengths of web, and therefore have matching sets of data, is less than 1 in 100,000.)

While {row,column} watermark payloads for each block on each printing plate can help further distinguish different regions of the printed web, other techniques can be used as well.

For example, some printing or packaging operations employ high speed ink-jet printing, e.g., to apply lot-codes, or expiration dates, to different parts of the web (or to different items produced from the web—such as packaging). Given the high speeds at which the printing target moves, there is some variability in the precise substrate location at which the ink-jet printing lands. The location of the ink-jet printing, as actually applied to the web/item can be sensed by a camera, can be stored as another datum by which different instances of a particular product can be distinguished.

From the foregoing, it will be recognized that certain embodiments of the technology meet the need for item serialization, without incurring the cost of introducing a dedicated print step for variable printing (e.g., as was employed in the Starbucks example, above), and without requiring additional package real-estate for a machine-readable feature (e.g., a barcode).

Further Remarks

While the above use of two watermark blocks is exemplary, it is not limiting. The same principles can be applied with three or more blocks—geometrically extending the length of web that can be printed without repetition, and geometrically extending the number of unique item instances that can reliably be distinguished from each other.

Similarly, while square watermark blocks—arrayed in tiled fashion, were referenced above, it will be recognized that other forms of watermarks can be used. And block watermarks needn't be arrayed in edge-to-edge tiled configuration (e.g., overlap may occur, or an un-watermarked boundary may exist between adjacent blocks).

The watermark blocks can be of any size, such as one-third inch in width, a half-inch, an inch, three inches, five or more inches, etc. Likewise, the WPI measurement can span a range of values from single digits, to 100, 200 or more. Similarly with the number of waxels in a block.

Although a single machine was described as applying both the WM1 and WM2 patterns, this is not essential. Indeed, many applications are better served by printing a full roll of substrate with one watermark pattern. This once-printed roll of substrate can then be used in a subsequent printing operation—either using the same printing apparatus that applied the first watermark pattern, or a different apparatus. In some cases, one party (e.g., a substrate provider, such as a paper producer) may pre-print stock with WM1 and deliver the pre-printed substrate to a second party. This second party (e.g., a printing company) then applies WM2 to the once-printed stock.

In the arrangement just-described, the WM2 pattern applied in the second printing operation has an unknown initial spatial offset relative to the pre-printed WM1. The initial offset is essentially random, due to the uncontrolled location at which the substrate may be cut to make a clean edge for introduction into the apparatus that applies the WM2 pattern, the uncertainty of the apparatus feed mechanism before the substrate starts moving through the machine, etc.

Figure 20:
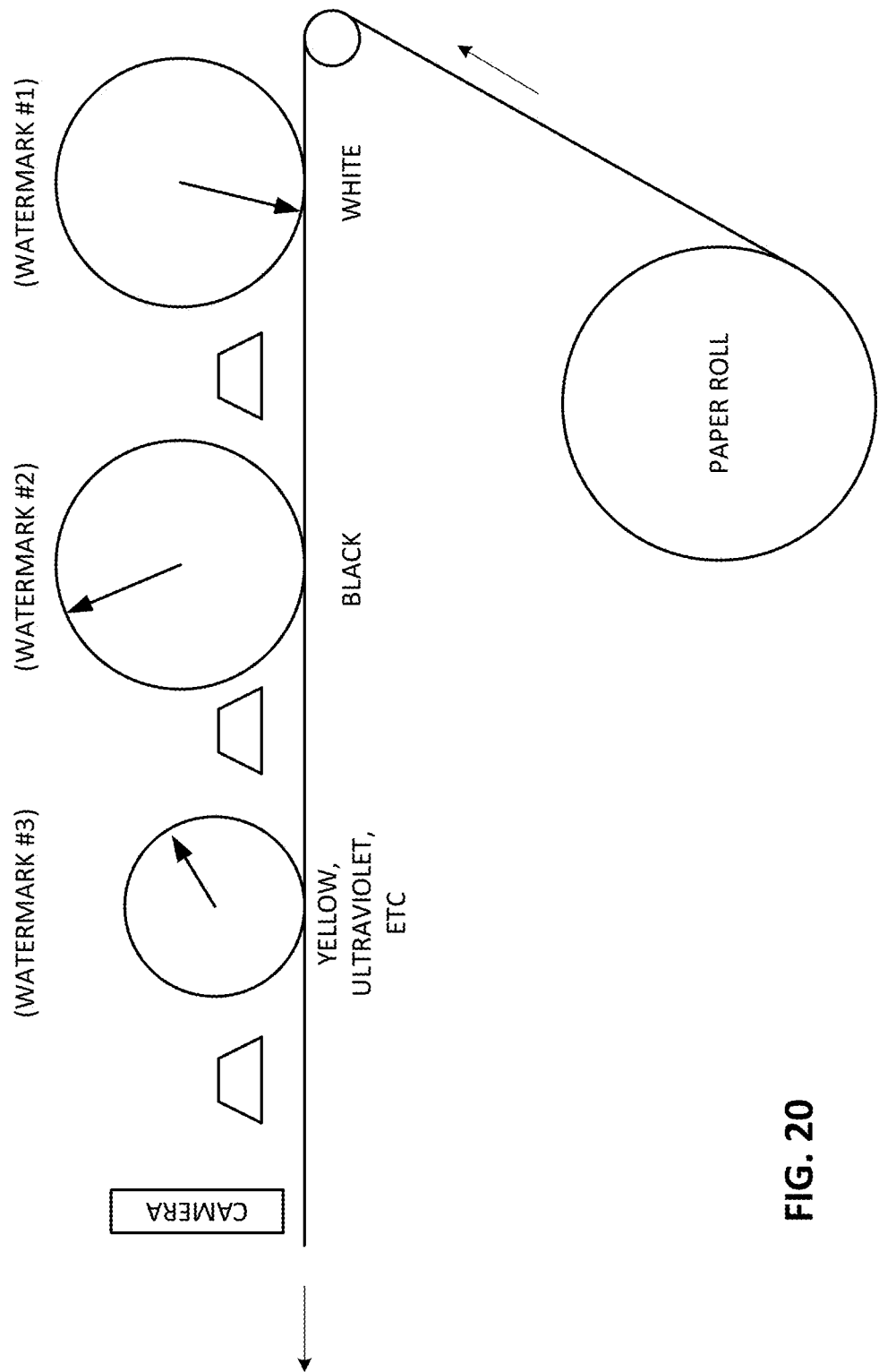
FIG. 20 shows another illustrative printing apparatus in accordance with a further example of the present technology.

As noted earlier, offsets often make sparse use of the available universe of possible offset values. Thus, the offsets resulting from passage of one roll of substrate through a machine may be entirely different (following a different progression series) than offsets resulting from passage of another roll of that substrate through the machine. The set of offsets in the first printed roll can be decoded from imagery captured by a camera (such as is shown in FIGS. 7, 15 and 20), and stored for later use. Likewise for the set of offsets in the second printed roll. This serves as a further dimension of serialization.

The illustrated cameras desirably capture imagery at a sufficiently-fast frame rate to capture image frames depicting each part of the printed web to be imaged—some parts of the web appearing in two consecutive frames). A processor connected to the camera can discern the spatial offset associated with each WM1 block along the web. This information can be stored, to serve as a catalog of the uniquely-serialized objects produced during that print run. In some cases, metadata is stored in association with this identifying information. For example, a certain part of the web may be used to package Wheaties cereal destined for shelves of Albertson's grocery stores; another part may be used to package Wheaties cereal destined for shelves of Safeway grocery stores. A data structure like that depicted in FIG. 3 can be used.

When the printed item is distributed, and it is desired to read the watermark information, the layers of cyan, magenta, yellow, and black ink may cover parts of the WM1 applied by print mechanism 16. Desirably, the field of view imaged by the camera of the decoding system spans some white part of the package (e.g., a Nutrition Facts area on a food package).

As noted, product serialization has various applications—not just enabling consumer games. When a manufacturer packages product, it can image the packaging to discern the hidden serialization information, and store this information in association with metadata, such as production date, production plant, shift, etc. Likewise, in a retail store, or later, the package can be re-imaged to again discern this serialization information, and gain access to the earlier-stored corresponding metadata (or to store additional metadata, such as the date the package was sold to a customer, or even the customer to whom it was sold).

The watermarks can convey payloads other than, or in addition to, those discussed. One form of payload is simply a random number, which can be looked-up in a data structure to obtain metadata associated with that identifier.

Previously, stores tracked the number of Wheaties cereal boxes they sold, but did not track which particular boxes were sold. The serialization afforded by the present technology allows this finer degree of inventory management and monitoring to be achieved. This, in turn, enables a variety of further functionality—including additional variations on established game themes. For example, when a shopper claims a $10 gift card reward for purchasing four bags of Starbucks, Starbucks (or a service provider) can check that the identified bags were actually purchased (i.e., that a dishonest shopper didn't peel off the adhesive labels in the store without purchasing the items).

Augmented or virtual reality can be triggered by artwork or steganographic encoding on printed items, such as retail products. By serializing the items, and tracking which have been purchased from a store—and which have not—a system can provide a first augmentation for a package while it is in a grocery store, and a second augmentation for the package after it has gone through checkout. That is, when an item is purchased, an entry is made in a database. This entry can cause an augmentation for the item to change, or an augmentation to be enabled. For example, viewing of ESPN sports programming from Gatorade bottles (see, e.g., pending application Ser. No. 14/152,925, filed Jan. 10, 2014) may be enabled only after a shopper has purchased the bottle. A different payoff may be provided if the shopper interacts with the bottle while it is still on the store shelf.

A store can likewise identify the uniquely-serialized packages that cross its checkout stations, and report this information—to the store's corporate office, to a service provider, to the product producer, etc.

Exemplary substrate feed mechanisms are shown, e.g., in U.S. Pat. Nos. 3,827,358, 4,030,722, 4,173,314, 4,359,178, 4,543,152, 5,183,251, and 5,645,274. Many such arrangements employ vacuums, pick rollers, and other mechanisms whose operation varies over time due to factors such as temperature, humidity, wear, friction, lubrication, variability in the leading edge of the substrate, etc., introducing spatial uncertainty in position of the fed substrate.

Yet Another Aspect

In accordance with an illustrative embodiment of yet another aspect of the present technology, a laminate or other film medium is embossed with a pattern that conveys both a human-visible structure, and a steganographically-encoded plural-bit payload. With the passage of time, the pattern degrades, due to the medium's tendency to return to its original flat shape. This degradation does not return the medium to its original flat form, but rather just impairs some of its finest details. The human-visible structure of the pattern persists after such degradation. However, the steganographically-encoded information is impaired.

A smartphone app or other device camera-equipped system employed to decode the plural-bit payload information from the pattern may be able to correctly decode the payload despite such degradation in the embossed pattern—due to forward error correction techniques (e.g., block-coding and convolutional coding) that are used to allow data recovery even in the presence of channel noise and other data corruptions. However, the raw bits on which the forward error correction processing are based will include more and more bit errors with the passage of time. The decoder software can determine the count of raw bit errors and use it as an indication of the time that has elapsed since the medium was first shaped. Such detection technology is thus useful to ensure that foodstuffs and medications are fresh enough for use.

The degradation in the embossed pattern occurs at a faster rate at higher temperatures. If such a patterned medium is used in a safety seal or packaging for a pharmaceutical bottle, and the bottle is kept refrigerated (e.g., at 40 degrees F.), the bit error count sensed from the medium may stay within fresh bounds for two weeks. However, if the bottle is left at room temperature (e.g., at 70 degrees F.) for four hours, enough degradation may occur to cause the bit error rate to signal the product is no longer fresh.

In accordance with another aspect, a medium that has been patterned to encode a steganographic payload is used as a seal for a container whose contents are packed under a partial vacuum (or are packed under pressure). The partial vacuum (pressure) may be of various origins, such as sealing at a lowered (heightened) atmospheric pressure, or sealing a product at an elevated (reduced) temperature (which then cools (warms) and contracts (expands)). The vacuum (pressure) draws the seal tight—stressing the medium, and slightly deforming the pattern that encodes the watermark payload. Again, this deformation leads to bit errors in the raw bits represented by features of the pattern. Reading of the watermark with a smartphone or other camera-equipped system will reveal the high bit error rate. In this case, a high bit error rate signals a safe product. In contrast, if the seal is broken, the vacuum (pressurization) is lost, and the medium returns to its unstressed configuration. In the latter configuration, the bit error rate is reduced. This lower bit error rate indicates an unsafe product.

Figure 21:
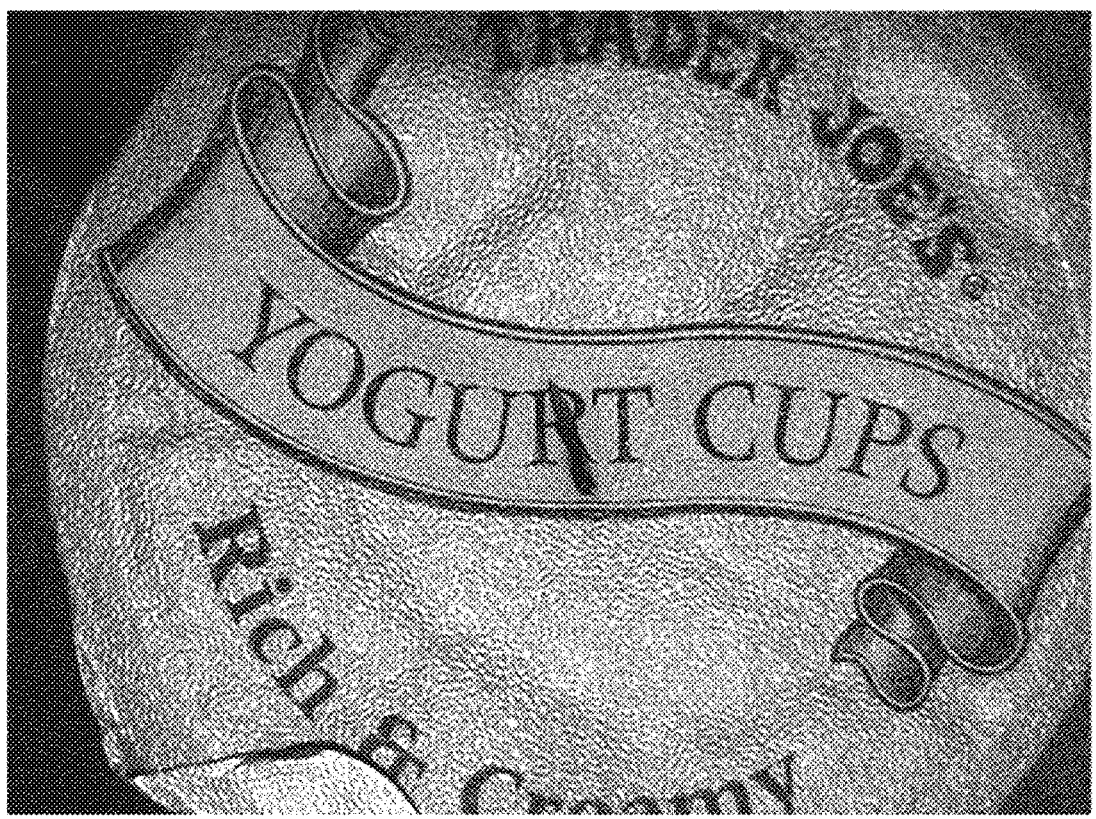
FIG. 21 shows a printed and textured piece cut from a foil substrate, applied as a sealing lid to a yogurt package.

FIG. 21 shows such a textured medium applied as a sealing lid to a yogurt package. Normally, the lid is drawn tight by a partial vacuum. But the illustrated lid has been punctured by a knife, relaxing the structure, reducing the raw bit error count in a watermark payload decoded from an image of the texturing.

In a variant embodiment, the watermark pattern with which the medium is textured can be pre-distorted in anticipation of the stress and stretch it will exhibit when employed as a vacuum seal. That is, the raw bit pattern can be pre-distorted so that it appears in a correct, non-distorted configuration when employed as a product seal and stressed by the pull of the vacuum. A watermark decoder will find a low bit error rate in this configuration. In contrast, if the vacuum is lost, and the medium returns to its un-stressed configuration, the patterning will return to its pre-distorted configuration. In this state, a high raw bit error rate will be observed by the detector.

Similar principles can be employed with laminate structures. Consider an individually-packaged pharmaceutical tablet. The package comprises a "blister" arrangement in which a plastic pocket, containing the pill, is closed with a textured laminate structure back that comprises a polymer film that is vacuum-adhered to a foil substrate. This vacuum is maintained by an adhesive or other sealing material disposed around the periphery of the laminate. The film texturing (or foil texturing) again conveys a steganographically encoded digital watermark pattern.

If the peripheral seal, between the film and the foil, is broken, air is introduced between the formerly-adhered laminate layers, and the vacuum is lost. This change subtly distorts the surface topology of the polymer film (or the foil). As in the examples just-given, this distortion can either increase, or decrease, the count of raw bit errors encountered in reading the steganographically-encoded watermark from the back of the pill package, thereby signaling that the package should not be trusted.

Suitable foils, films and other media are familiar to the artisans, e.g., as identified in the above-referenced publications. The bit-error rates that signal freshness, or lack thereof, can be determined empirically for a given medium and embossing process (and, where appropriate, temperature cycling), without undue experimentation.

While the just-detailed arrangements involved steganographically-textured substrates, it should be noted that ink-printed substrates exhibit a similar behavior. That is, the physical scale of the printing stretches subtly when the substrate is tensioned, giving rise to raw bit error measurements that signal the stretching.

From the foregoing disclosure it will be recognized that a tensioning or relaxing of a planar material, which may generally escape the notice of human observers, is readily sensed through raw bit error measurements taken from steganographic encoding formed on the material.

Review

The following paragraphs review just a few of the inventive arrangements of the present technology detailed herein.

One aspect concerns forming on a substrate first and second patterns, and determining spatial offset information that relates these patterns. An action is then taken based on the determined offset information. (The action can comprise, e.g., determining information about an item that includes the substrate, or distinguishing a first item depicted in a first image from a second item depicted in a second image.)

The substrate may comprise an elongated roll of material (a "web"), and the method can include cutting individual items (e.g., lids or labels) from the substrate after the patterns have been formed. In some arrangements, the individual items cut from the web are characterized by all having a common spatial offset between the first and second patterns. In other arrangements, each of the individual items cut from the web is characterized by a different spatial offset between the first and second patterns.

Another aspect of the technology concerns sensing first and second patterns from a substrate, and determining a spatial offset between the two patterns. A judgment is then made about an item including such substrate, based on the determined spatial offset.

A further method involves printing, on a substrate, a pattern including plural first digital watermark tiles, and embossing on the substrate a second pattern including plural tiles. After such printing and embossing, spatial offset information is determined that relates the first and second tiles on the substrate. (Such offset is not previously known.) The determined offset information is stored for later use in authenticating the substrate.

Yet another aspect of the technology involves identifying a marker signal from a substrate. A search is conducted for a steganographic payload signal encoded in the substrate. This searching is bounded in a spatial neighborhood determined by reference to the identified marker signal. Offset information is then determined, relating the marker signal to the steganographic payload signal. The thus-determined spatial offset information is useful, e.g., in authenticating the substrate.

Still another aspect of the technology comprises printing, on a substrate, a first pattern including plural first digital watermark tiles, and embossing on the substrate a second pattern including plural second digital watermark tiles. In such arrangement, the first digital watermark tiles convey payload information but lack spatial calibration information, and the second digital watermark tiles convey spatial calibration information.

Another aspect of the technology concerns producing printed items by acts including: printing a substrate with a first watermark pattern, characterized by a first measurement, and printing the substrate with a second watermark pattern, characterized by a second measurement different than the first measurement. (Typically, although not necessarily, the first and second measurements do not have a common integer factor.) In some arrangements, the second watermark pattern is inclined at a non-zero angle (other than ninety degrees, and its integer multiples) relative to the first watermark pattern.

A further aspect of the technology concerns producing printed items by acts including: in a first stage of operation, printing a first watermark pattern on a first web substrate using a first roller mechanism, and printing a second watermark pattern on the first web substrate using a second roller mechanism, where the first and second roller mechanisms having a first phase relationship that causes the first and second patterns applied to the first web to be characterized by a first offset therebetween, the first stage of operation yielding a first set of printed items. The phase relationship between the first and second roller mechanisms is then changed. In a second stage of operation, the first watermark pattern is printed on a second web substrate using the first roller mechanism, and a second watermark pattern is also printed on the second web substrate using the second roller mechanism. This second phase relationship between the mechanisms causes the first and second patterns applied to the second web to be characterized by a second offset therebetween, this second stage of operation yielding a second set of printed items. Such changing of the phase relationship allows an item in the second set of printed items to be distinguished from an item in the first set of printed items.

Yet another aspect of the technology involves applying a steganographic decoding process to imagery depicting at least part of a consumer packaged product, where the process identifies bit error information. A judgment is then made about the product from this bit error information. For example, the judgment may relate to an age of the product, or to a pressurization condition of the product.

Another aspect of the technology concerns determining a pressure condition of a container. Such a method includes receiving imagery depicting at least part of the container; applying a steganographic decoding process to imagery depicting at least part of a containing—such process identifying bit error information; and discerning information about pressurization of the container based on a result from the steganographic decoding process.

A further aspect of the technology concerns detecting tampering with a laminate (e.g., first and second layers adhered by a vacuum). Such a method includes applying a steganographic decoding process to imagery depicting at least part of the laminate; and discerning whether the vacuum adhesion of the laminate layers has been breached, based on a result from the steganographic decoding process.

Yet another aspect of the technology is a consumer food container (e.g., a wine bottle) having a medium attached thereto (e.g., a bottle cap), where the medium conveys a digital watermark pattern that changes with time (e.g., as a patterned film or foil relaxes).

CONCLUDING REMARKS

While reference was made to app software on a smartphone that performs certain of the detailed functionality, in other embodiments such functions can naturally be performed otherwise—including by operating system software on the smartphone, by a web service with which the phone communicates, etc.

While repeated reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 5; smartphones following Google's Android specification (e.g., the Galaxy S IV phone, manufactured by Samsung, and the Google Moto X phone, made by Motorola), and Windows 8 mobile phones (e.g., the Nokia Lumia 1020, which features a 41 megapixel camera).

Details of the Apple iPhone, including its touch interface, are provided in Apple's published patent application 20080174570.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

The processes and system components detailed in this specification can be implemented as instructions for computing devices, including general purpose processor instructions for a variety of programmable processors, including microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. As noted, cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Detection of watermark data is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

As indicated, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A headworn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc.) Exemplary wearable technology is detailed in U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

The techniques of digital watermarking are presumed to be familiar to the artisan. Examples are detailed, e.g., in Digimarc's U.S. Pat. Nos. 6,614,914, 6,590,996, 6,122,403, 20100150434, 20110274310, and 20140052555. Such watermarks are commonly imperceptible, meaning they are not noticeable to a viewer examining watermarked packaging from a typical viewing distance (e.g., 20 inches). Spot colors, as are sometimes found on packaging, can be watermarked by leaving tiny voids in the printing to subtly change the luminance or chrominance. Alternatively, a spot color (e.g., as indicated by a Pantone color number) may be overprinted by a CMYK approximation of the Pantone color; this overprinting can convey the watermark signal. (Pantone publishes CMYK approximations for its catalog of colors.) Other techniques for watermarking of spot colors are detailed in U.S. Pat. No. 6,763,124 and published application Ser. No. 13/975,919, filed Aug. 26, 2013.

Applicant's other work that is relevant to the present technology (e.g., concerning smartphones, grocery items, watermarks, etc.) includes that detailed in pending application Ser. No. 14/251,229, filed Apr. 11, 2014, and in published applications 20110212717, 20110161076, 20120284012, 20120214515, 20130223673 and 20130260727.

This specification has disclosed several different embodiments. It should be understood that the methods, elements and concepts detailed in connection with one embodiment can be combined with the methods, elements and concepts detailed in connection with other embodiments. While some such arrangements have been particularly described, many have not—due to the large number of combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. (The reader is presumed to be familiar with such prior work.) Those references disclose technologies and teachings that the inventors intend be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties—as if fully set forth herein, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof. (These claims encompass only a subset of what is regarded as inventive in this disclosure. No surrender of unclaimed subject matter is intended, as applicant reserves the right to submit additional claims in the future.)

The invention claimed is:

1. A method comprising the acts:
  printing, on a substrate, a first tiled pattern comprising plural edge-adjoining first blocks;
  embossing, on said substrate, a second tiled pattern comprising plural edge-adjoining second blocks;
  cutting first and second pieces from said substrate;
  determining a first spatial offset between the first and second patterns on the first piece; and
  determining a second spatial offset between the first and second patterns on the second piece;
  wherein the first and second spatial offsets are different, according to a progressive variation along a length of said substrate.

2. A method of fabricating a marked substrate comprising the acts:
  printing, on a rolled substrate, a first pattern including plural first digital watermark tiles;
  embossing, on said substrate, a second pattern including plural edge-adjoining tiles;
  after said printing of the first and second patterns, identifying an excerpt of the rolled substrate, and determining spatial offset information that relates the first and second tiles on the excerpt; and
  storing said spatial offset information for use in identifying the excerpt;
  wherein the spatial offset information is not known until said determining act;
  wherein forming of the first and second patterns is performed with first and second rollers, respectively; and
  the first and second rollers have different diameters, causing the spatial offset between the embossed and printed patterns to progressively change along a length of the rolled substrate, during fabrication of the marked substrate.

3. The method of claim 2 wherein said printing and embossing acts are performed with a foil substrate.

4. The method of claim 2 wherein one of said printing and embossing acts is performed with a shaped roller.

5. A foil substrate that has been processed by the method of claim 2.

6. The method of claim 1 in which the first pattern comprises a digital watermark pattern.

7. The method of claim 1 in which the forming act comprises embossing.

8. The method of claim 1 in which the forming and creating acts are performed on a foil substrate.

9. The method of claim 1 that further includes applying said first piece of substrate to a container of foodstuff as a label.

10. The method of claim 1 that further includes airtight sealing a container of foodstuff using said first piece of substrate.

11. The method of claim 1 that further includes:
  capturing first and second images, depicting the first and second pieces of substrate, respectively;
  determining said first and second spatial offsets from said captured first and second images; and
  after said capturing and determining, using the first and second pieces of substrate in packaging first and second items of a foodstuff;
  wherein the first and second items can thereafter by distinguished by said differing first and second spatial offsets.

12. The first piece of substrate produced by the method of claim 1.

13. The method of claim 2 in which the act of identifying the excerpt comprises cutting the excerpt from the substrate.

14. The method of claim 2 in which the first roller defines a first integral number of tiles around its circumference, and the second roller defines a second, different, integral number of tiles around its circumference.

15. The method of claim 2 in which an axis along which tiles of the first pattern are arrayed, is inclined at a non-zero angle relative to an axis along which tiles of the second pattern are arrayed.

16. The method of claim 2 in which a first watermark tile of the first pattern encodes a first identifier, and a second watermark tile of the first watermark pattern encodes a second identifier different than the first.

17. The method of claim 2 in which the first roller defines an array of NxM watermark tiles, and each of said NxM watermark tiles encodes a different identifier.

18. An elongated substrate formed with first and second patterns, each pattern comprising plural edge-adjoining blocks, the first pattern comprising a steganographic digital watermark pattern, wherein the blocks of the first pattern are of a different size than the blocks of the second pattern, and the blocks are so-arranged that a spatial offset between a block of the first pattern and a proximate block of the second pattern progressively varies along a length of said elongated substrate, wherein two pieces cut from said substrate at different locations along its length will exhibit differing spatial offsets between the first and second patterns, serving as a form of serialization wherein said first pattern is a printed pattern and said second pattern is an embossed pattern.

* * * * *

UNITED STATES PATENT AND TRADEMARK OFFICE
CERTIFICATE OF CORRECTION

PATENT NO.        : 9,898,793 B2
APPLICATION NO.   : 14/446068
DATED             : February 20, 2018
INVENTOR(S)       : Tony F. Rodriguez It is certified that error appears in the above-identified patent and that said Letters Patent is hereby corrected as shown below:

On the Title Page

Under abstract "18 Claims, 15 Drawing Sheets" should read --16 Claims, 15 Drawing Sheets--

In the Claims

Column 26, Claims 7-8, Lines 58-61 delete "7. The method of claim 1 in which the forming act comprises embossing.
8. The method of claim 1 in which the forming and creating acts are performed on a foil substrate"

Column 26, Claim 9, Line 62 delete "9." and insert --7.--

Column 26, Claim 10, Line 65 delete "10." and insert --8.--

Column 27, Claim 11, Line 1 delete "11." and insert --9.--

Column 27, Claim 11, Line 9 after "thereafter", delete "by" and insert --be--

Column 27, Claim 12, Line 12 delete "12." and insert --10.--

Column 27, Claim 13, Line 14 delete "13." and insert --11.--

Column 27, Claim 14, Line 16 delete "14." and insert --12.--

Column 27, Claim 15, Line 20 delete "15." and insert --13.--

Column 28, Claim 16, Line 1 delete "16." and insert --14.--

Signed and Sealed this
Twenty-fifth Day of September, 2018

Andrei Iancu
*Director of the United States Patent and Trademark Office*

CERTIFICATE OF CORRECTION (continued)
U.S. Pat. No. 9,898,793 B2

Column 28, Claim 17, Line 5 delete "17." and insert --15.--

Column 28, Claim 18, Line 8 delete "18." and insert --16.--